US012659780B2

(12) United States Patent
Yoshioka et al.

(10) Patent No.: US 12,659,780 B2
(45) Date of Patent: Jun. 16, 2026

(54) COMMUNICATION APPARATUS AND COMMUNICATION METHOD

(71) Applicant: NTT DOCOMO, INC., Tokyo (JP)

(72) Inventors: Shohei Yoshioka, Tokyo (JP); Shinya Kumagai, Tokyo (JP); Yuki Takahashi, Tokyo (JP); Mayuko Okano, Tokyo (JP); Masaya Okamura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 351 days.

(21) Appl. No.: 18/277,479

(22) PCT Filed: Mar. 5, 2021

(86) PCT No.: PCT/JP2021/008817
§ 371 (c)(1),
(2) Date: Aug. 16, 2023

(87) PCT Pub. No.: WO2022/185548
PCT Pub. Date: Sep. 9, 2022

(65) Prior Publication Data
US 2024/0129777 A1 Apr. 18, 2024

(51) Int. Cl.
*H04W 4/00* (2018.01)
*H04W 24/08* (2009.01)
*H04W 24/10* (2009.01)
(52) U.S. Cl.
CPC ........... *H04W 24/10* (2013.01); *H04W 24/08* (2013.01)
(58) Field of Classification Search
CPC ............................. H04W 24/10; H04W 24/08
See application file for complete search history.

(56) References Cited

U.S. PATENT DOCUMENTS

| | | | |
|---|---|---|---|
| 12,150,128 B2 | 11/2024 | Park et al. | |
| 2007/0288824 A1 | 12/2007 | Yeo et al. | |
| 2019/0261347 A1* | 8/2019 | Harada | H04W 88/02 |
| 2019/0372642 A1* | 12/2019 | Kakishima | H04L 5/0048 |

(Continued)

FOREIGN PATENT DOCUMENTS

| | | |
|---|---|---|
| JP | 2007517458 A | 6/2007 |
| WO | 2010109524 A1 | 9/2010 |

(Continued)

OTHER PUBLICATIONS

Office Action issued in Japanese Patent Application No. 2023-503336, dated Feb. 18, 2025 (6 pages).
3GPP TSG RAN WG1 #99; R1-1912884; NTT Docomo, Inc.; "Sidelink physical layer procedure for Nr V2X"; Reno, US; Nov. 18-22, 2019 (9 pages).
International Search Report issued in PCT/JP2021/008817 on Sep. 28, 2021 (5 pages).

(Continued)

*Primary Examiner* — Deepa Belur
(74) *Attorney, Agent, or Firm* — Osha Bergman Watanabe & Burton LLP

(57) ABSTRACT

A communication apparatus includes a receiving unit configured to receive, from another communication apparatus, a signal requesting a CSI (Channel State Information) report and a CSI reference signal, in a resource autonomously selected by the another communication apparatus; a control unit configured to perform measurement by using the CSI reference signal; and a transmitting unit configured to transmit, to the another communication apparatus, a CSI report based on a result of the measurement.

5 Claims, 12 Drawing Sheets

(56) References Cited

U.S. PATENT DOCUMENTS

| | | | |
|---|---|---|---|
| 2022/0287006 A1 | 9/2022 | Yoshioka et al. | |
| 2022/0329301 A1 | 10/2022 | Shin et al. | |
| 2022/0377589 A1* | 11/2022 | Hashimoto | H04B 7/0695 |
| 2023/0097142 A1* | 3/2023 | Alfarhan | H04B 17/318 |
| | | | 370/329 |
| 2024/0322966 A1* | 9/2024 | Elshafie | H04W 72/23 |

FOREIGN PATENT DOCUMENTS

| | | | |
|---|---|---|---|
| WO | 2012124552 A1 | 9/2012 |
| WO | 2018/088538 A1 | 5/2018 |
| WO | 2020/230213 A1 | 11/2020 |
| WO | 2021010773 A1 | 1/2021 |
| WO | 2021024493 A1 | 2/2021 |
| WO | 2021040379 A1 | 3/2021 |

OTHER PUBLICATIONS

Written Opinion of the International Searching Authority issued in PCT/JP2021/008817 on Sep. 28, 2021 (4 pages).

3GPP TS 38.300 V16.4.0; "3rd Generation Partnership Project; Technical Specification Group Radio Access Network; NR; NR and NG-RAN Overall Description; Stage 2 (Release 16)"; Dec. 2020 (149 pages).

White Paper on "5G Evolution and 6G", NTT Docomo, Inc., Jan. 2020 (34 pages).

Extended European Search Report issued in the counterpart European Application No. 21929120.0, mailed Nov. 11, 2024 (9 pages).

Office Action issued in counterpart Japanese Patent Application No. 2023-503336 mailed on Jul. 1, 2025 (5 pages).

* cited by examiner

CSI REQUEST

20

10

CSI REPORT CONTENT

CSI
REQUEST

CSI
REPORT

TIME DURING WHICH CSI REPORTING
CAN BE PERFORMED

Tmax

TIME

COMMUNICATION APPARATUS AND COMMUNICATION METHOD

TECHNICAL FIELD

The present invention relates to a communication apparatus and a communication method in a wireless communication system.

BACKGROUND ART

In 3GPP (3rd Generation Partnership Project), in order to realize a further increase in system capacity, a further increase in the data transmission speed, less delay in a radio section, etc., studies are being made with respect to a radio communication method referred to as 5G or NR (New Radio) (hereinafter, the radio communication method is referred to as "NR"). In 5G, various radio technologies and network architectures are being studied, in order to satisfy the requirement of setting the delay in the radio section to 1 ms or less while realizing a throughput of 10 Gbps or more (e.g., Non-Patent Literature 1).

Further, 6G has started to be studied as the next generation wireless communication system of 5G, and it is expected that wireless quality exceeding 5G will be realized. For example, 6G is being studied to realize a further increase in capacity, use of a new frequency band, less delay, higher reliability, extended coverage in new domains (in a high altitude, the sea, and space), and the like (e.g., Non-Patent Literature 2).

CITATION LIST

Non-Patent Literature

[NPTL 1] 3GPP TS 38.300 V16.4.0 (2020-12)
[NPTL 2] NTT DOCOMO, INC., White Paper, Advancement of 5G and 6G (2020-01)

SUMMARY OF INVENTION

Technical Problem

In 6G, higher frequencies compared to conventional cases are expected to be used for further improvement in communication speed, capacity, reliability, and delay performance. When such higher frequencies are used, wide bandwidths will be available and radio waves will be characterized by high linearity and low frequency selectivity. Further, Doppler shift is large and path loss is large.

Due to the characteristics of the frequency band that uses such high frequencies, control rules different from cell design or base station scheduling techniques of conventional cases may be more desirable in terms of network performance. For example, a system in which a terminal or a base station autonomously determines the resources to be used for transmission may be considered because it is assumed that the collision probability of resources may be lower than conventional cases. It is necessary to define a method for CSI (Channel State Information) measurement and CSI reporting in the system.

The present invention has been made in view of the above, and an object of the present invention is to improve transmission quality by measuring the channel state and reporting the measurement result in a wireless communication system that autonomously determines the resources to be used.

Solution to Problem

According to the disclosed technology, a communication apparatus is provided, the communication apparatus including a receiving unit configured to receive, from another communication apparatus, a signal requesting a CSI (Channel State Information) report and a CSI reference signal, in a resource autonomously selected by the another communication apparatus; a control unit configured to perform measurement by using the CSI reference signal; and a transmitting unit configured to transmit, to the another communication apparatus, a CSI report based on a result of the measurement.

Advantageous Effects of Invention

According to the disclosed technology, in a wireless communication system that autonomously determines the resources to be used, the channel state is measured and the measurement result is reported so that the transmission quality can be improved.

BRIEF DESCRIPTION OF DRAWINGS

FIG. 1 is a diagram for explaining an example (1) of a wireless communication system in an embodiment of the present invention.

FIG. 3 is a diagram illustrating an example of scheduling.

FIG. 6 illustrates an example (3) of transmission and reception in an embodiment of the present invention.

FIG. 10 illustrates an example of CSI reporting operation in an embodiment of the present invention.

DESCRIPTION OF EMBODIMENT

Figure 2:
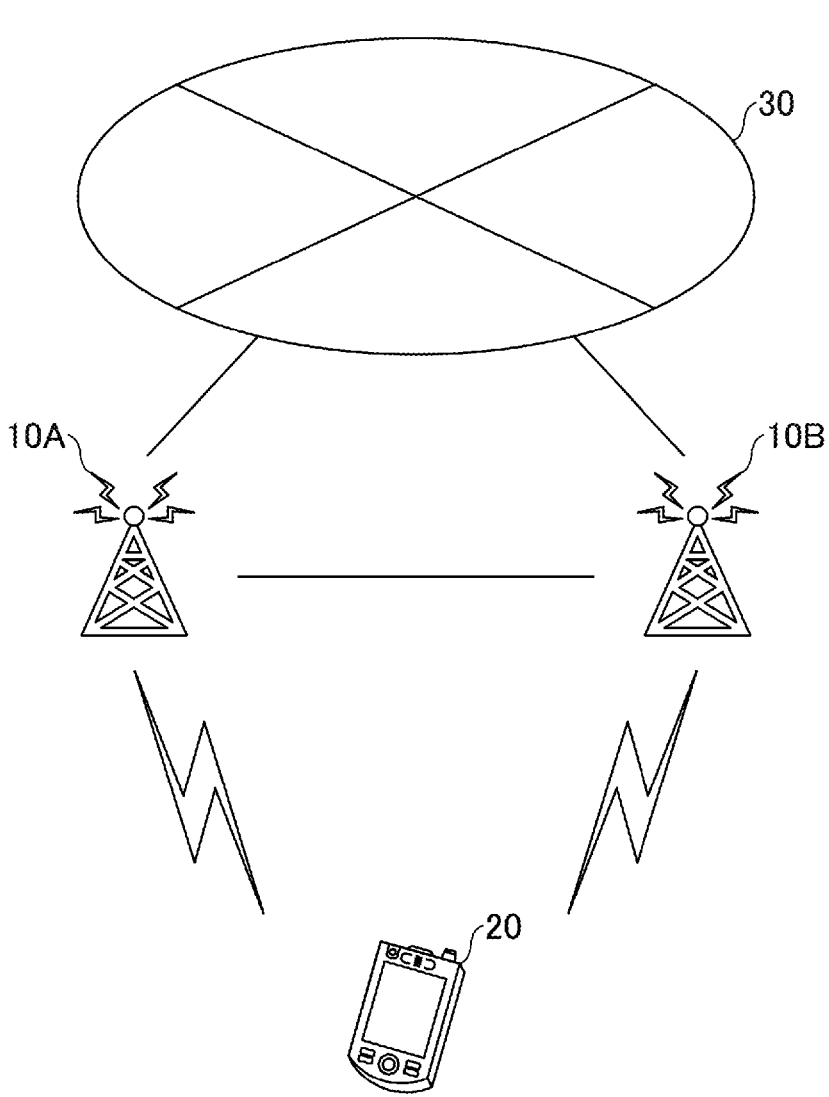
FIG. 2 is a diagram for explaining an example (2) of a wireless communication system in an embodiment of the present invention.

An embodiment of the present invention will be described below with reference to the drawings. Note that the embodiment described below is an example, and the embodiment to which the present invention is applied is not limited to the following embodiment.

In the operation of the wireless communication system of the embodiment of the present invention, the existing technology may be used as appropriate. The existing technology is, for example, existing NR or LTE, but is not limited to existing NR or LTE.

Figure 1:
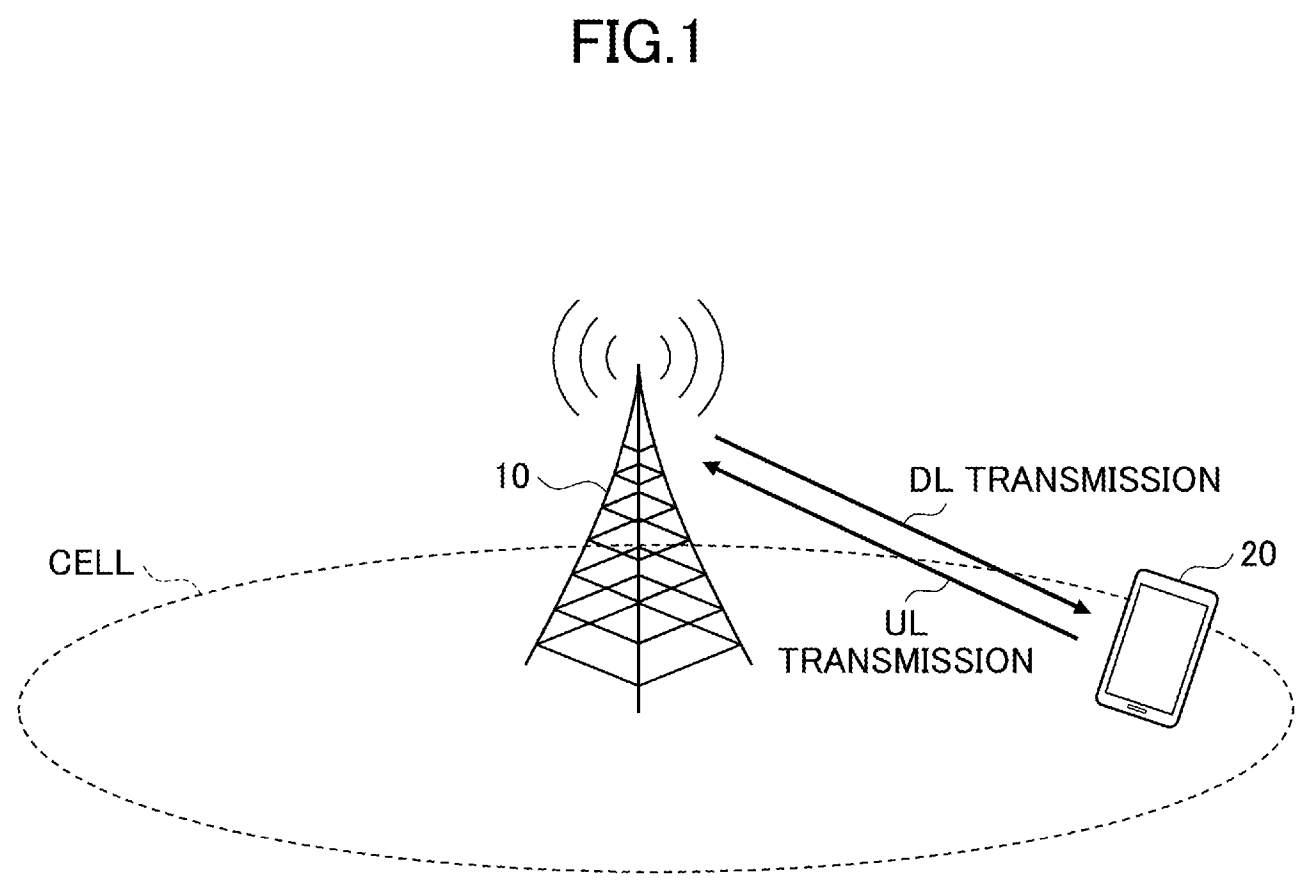

FIG. 1 is a diagram for explaining an example (1) of a wireless communication system in an embodiment of the present invention. The wireless communication system in an embodiment of the present invention includes a base station 10 and a terminal 20 as illustrated in FIG. 1. One base station 10 and one terminal 20 are illustrated in FIG. 1, but this is an example and each may be multiple.

The base station 10 is a communication apparatus that provides one or more cells and performs wireless communication with the terminal 20. The physical resources of the radio signals are defined in the time domain and the frequency domain, the time domain may be defined by the number of OFDM symbols, and the frequency domain may be defined by the number of subcarriers or the number of resource blocks. The Transmission Time Interval (TTI) in the time domain may be a slot, and the TTI may be a subframe.

The base station 10 can perform carrier aggregation by bundling multiple cells (multiple CCs (component carriers)) to communicate with the terminal 20. In carrier aggregation, one PCell (primary cell) and one or more SCells (secondary cells) are used.

The base station 10 transmits synchronization signals, system information, and the like to the terminal 20. The synchronization signals are, for example, NR-PSS and NR-SSS. The system information is transmitted by, for example, NR-PBCH or PDSCH, and is also referred to as broadcast information. As illustrated in FIG. 1, the base station 10 transmits control signals or data to the terminal 20 by DL (Downlink) and receives control signals or data from the terminal by UL (Uplink). Here, what is transmitted on a control channel such as PUCCH or PDCCH is referred to as a control signal, and what is transmitted on a shared channel such as PUSCH or PDSCH is referred to as data, but such a name is an example.

The terminal 20 is a communication apparatus equipped with a wireless communication function such as a smartphone, a mobile phone, a tablet, a wearable terminal, a machine-to-machine (M2M) communication module, and the like. As illustrated in FIG. 1, the terminal 20 uses various communication services provided by the wireless communication system by receiving control signals or data from the base station 10 by DL and transmitting control signals or data to the base station 10 by UL. Note that the terminal 20 may be referred to as UE and the base station 10 may be referred to as gNB.

The terminal 20 can perform carrier aggregation by bundling multiple cells (multiple CCs (component carriers)) to communicate with the base station 10. In carrier aggregation, one PCell (primary cell) and one or more SCells (secondary cells) are used. Further, a PUCCH-SCell with PUCCH may be used.

FIG. 2 is a diagram for explaining an example (2) of a wireless communication system in an embodiment of the present invention. FIG. 2 illustrates an example of a configuration of a wireless communication system when DC (Dual connectivity) is executed. As illustrated in FIG. 2, a base station 10A serving as a Master Node (MN) and a base station 10B serving as a Secondary Node (SN) are provided.

The base stations 10A and 10B are connected to a core network, respectively. The terminal 20 can communicate with both the base stations 10A and 10B.

The cell group provided by the base station 10A that is the MN is referred to as an MCG (Master Cell Group), and the cell group provided by the base station 10B that is the SN is referred to as an SCG (Secondary Cell Group). Further, in a DC, the MCG includes one PCell and one or more SCells, and the SCG includes one PSCell (Primary SCG Cell) and one or more SCells.

The DC may be a communication method using two communication standards, and any kind of communication standard may be combined with each other. For example, the combination may be either NR and the 6G standards or LTE and the 6G standards. Further, the DC may be a communication method using three or more communication standards and may be referred to by another name different from DC.

The processing operation in the present embodiment may be executed in the system configuration illustrated in FIG. 1, in the system configuration illustrated in FIG. 2, or in any other system configuration.

In 6G, it is assumed that higher frequencies than that of conventional cases will be used for further improvement of communication speed, capacity, reliability, delay performance, and the like. When such higher frequencies are used, wide bandwidths will be available, and radio waves will be characterized by high linearity and low frequency selectivity. Further, Doppler shift is large and path loss is large.

Due to the characteristics of the frequency band that uses such high frequencies, control rules different from cell design or base station scheduling techniques of conventional cases may be more desirable in terms of network performance. For example, collision avoidance and intercell interference reduction between DL-DL, between DL-UL, and between UL-UL are assumed to be less necessary than with conventional low frequencies.

Figure 3:
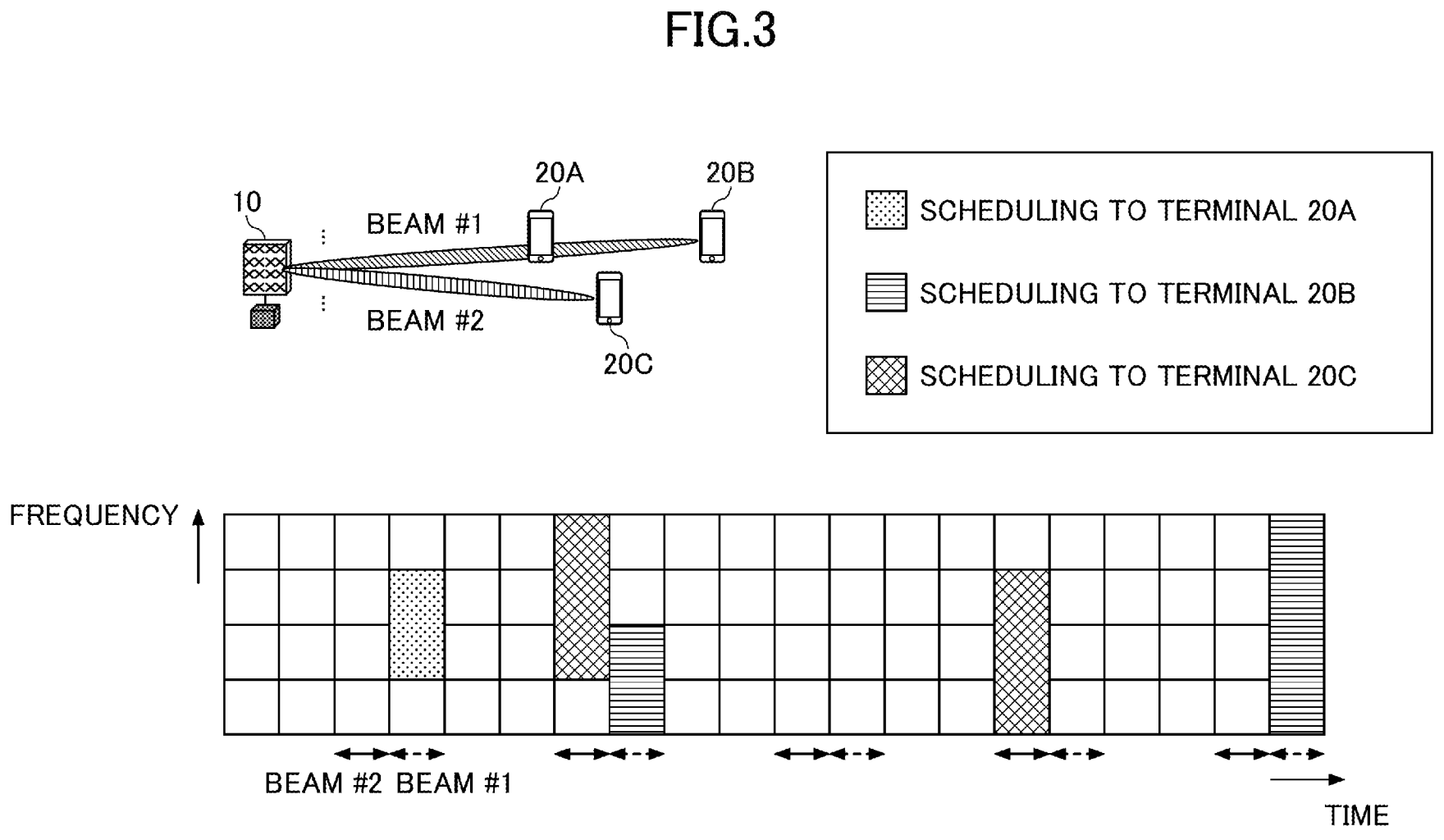

FIG. 3 illustrates an example of scheduling. In the example illustrated in FIG. 3, beamforming of the base station 10 is implemented in analog and scheduling by time division multiplexing (TDM) is performed for each beam. As illustrated in FIG. 3, beams #1 and #2 are multiplexed by TDM. In the example illustrated in FIG. 3, the base station 10 performs TDM scheduling for the terminals 20A and 20B using the beam #1 and for the terminal 20C using beam #2.

For example, control rule A) and control rule B) indicated below can be considered as control rules that are not based on scheduling, that is, control rules by which the communication apparatus transmitting the signal autonomously selects resources.

Control Rule A)

The transmission side apparatus transmits signals at free timings, with respect to both the base station 10 and the terminal 20. The receiving side apparatus is required to detect signals at all timings at which receiving is possible by both the base station 10 and the terminal 20. When a collision occurs between resources used for transmission, the collision is equivalent to a decoding error and retransmission with feedback may be performed. In a frequency band using higher frequencies than in conventional cases, because the beam is very narrow and the area is narrow, it is assumed that the number of the terminals 20 in a given beam is very small and the probability of collision of resources used for transmission is low even if scheduling by the base station 10 is not performed.

Control Rule B)

The transmitting side apparatus acquires transmission rights and transmits signals, with respect to both the base station 10 and the terminal 20. That is, the base station 10 and the terminal 20 transmit signals after executing the in-system LBT (Listen before talk). It is necessary for the receiving side apparatus to detect signals at all timings at which receiving is possible by both the base station 10 and the terminal 20. Collisions of resources used for transmission are avoided by the in-system LBT. In frequency bands that use higher frequencies than in conventional cases, in addition to the lower resource collision probability, the control rule B can operate to avoid collisions by pre-detecting resource collisions that rarely occur within the same beam or in inter-cell interference.

For both the control rule A and the control rule B, it be considered that there is a case in which there is frame synchronization and a case in which there is no frame synchronization. Hereafter, the control rule with frame synchronization is referred to as control rule A1 or control rule B1, and the control rule without frame synchronization is referred to as control rule A2 or control rule B2.

In control rule A1, control rule A2, control rule B1, and control rule B2, it is necessary to examine the transmission procedure and the signal detection procedure. Further, in the above-described control rule B1 and the above-described control rule B2, it is necessary to examine the LBT in the system. As the elements of LBT in the system, it is necessary to consider the transmittable time, semi-static transmission without LBT, and collision avoidance of frequency resources. Further, it is necessary to consider the preamble in the above-described control rule A2 and the above-described control rule B2. In the above-described control rule A1 and the above-described control rule B1, it is also necessary to consider blind detection of control signals.

Hereafter, the transmitting node or receiving node corresponds to either the base station 10 or the terminal 20.

Figure 4:
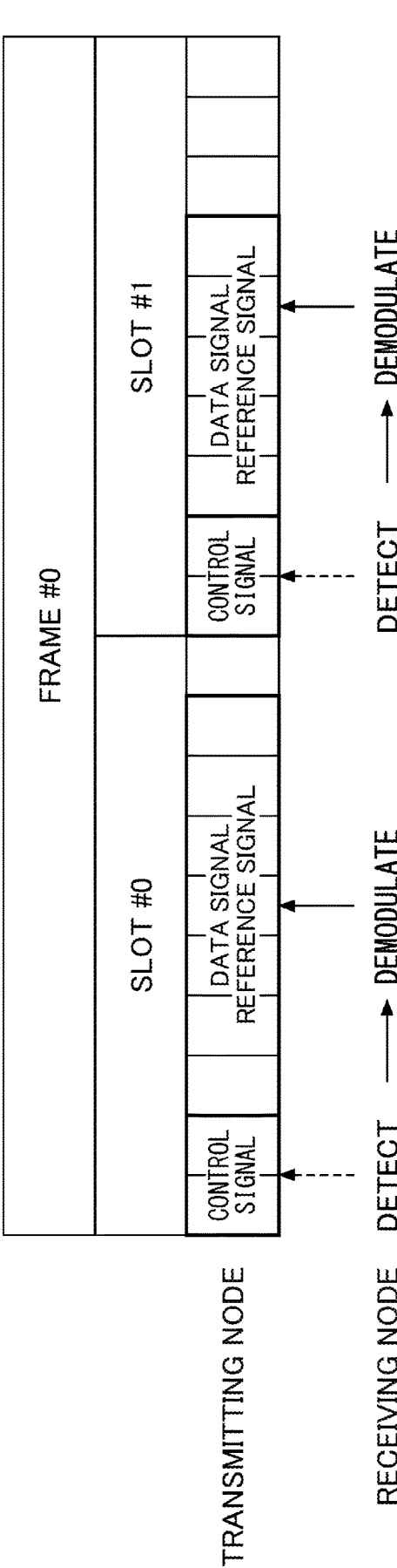
FIG. 4 illustrates an example (1) of transmission and reception in an embodiment of the present invention.

FIG. 4 is a diagram illustrating an example (1) of transmission and reception in an embodiment of the present invention. The procedure of the above-described control rule A1 is explained by using FIG. 4. In the above-described control rule A1, the operations of 1) to 4) indicated below may be performed.

1) The transmitting node may transmit the signal at a predetermined transmission timing. The transmitting signal may include at least one of a data signal, a control signal, and a reference signal. The predetermined transmitting timing may be determined based on frames synchronized between the transmitting and receiving nodes.

2) When the transmitting node continuously transmits multiple signals, the timing of transmission other than the first transmission may be determined based on the signal transmitted immediately before. For example, the transmission timing and transmission time length of the transmission other than the first transmission may be instructed to the transmitting node or may be preset in the transmitting node, and may be reported to the receiving node or may be preset in the receiving node. For example, the transmission timing of the transmission other than the first transmission may be x symbols after the end of the immediately preceding transmitted signal, y slots after the end of the immediately preceding transmitted signal, z frames after the end of the immediately preceding transmitted signal, or a combination of x, y and z. For example, the transmission time length of the transmission other than the first transmission may be a length from the xth symbol to the Lth symbol per slot.

In FIG. 4, an example is illustrated in which if the first transmission is performed in slot #0, the transmission in slot #1 is the transmission timing one symbol after the end of the immediately preceding transmitted signal, and the transmission timing and transmission time length are a length from the 0th symbol to the 7th symbol of the slot.

3) The receiving node may perform blind detection of the control signal. The resources or detection opportunities (for example, CORESET (control resource set) or search space) of the control signal may be defined in the specification or set or reported by the transmitting node. For example, in FIG. 4, the receiving node performs blind detection on the control signal transmitted to the two symbols at the top of the slot.

4) When the receiving node detects the control signal, the receiving node may perform demodulation of the data signal. The receiving node may identify the resource of the data and/or the reference signal based on the detection result of the control signal. For example, in FIG. 4, when the receiving node detects the control signal to be transmitted to the two symbols at the top of the slot, the receiving node may perform demodulation of the subsequent data signal and/or the reference signal.

The correspondence between the transmitting and receiving nodes is as follows. In the downlink, the transmitting node is the base station 10 and the receiving node is the terminal 20. In the uplink, the transmitting node is the terminal 20 and the receiving node is the base station 10. In the sidelink, the transmitting node is the terminal 20 and the receiving node is the terminal 20.

Figure 5:
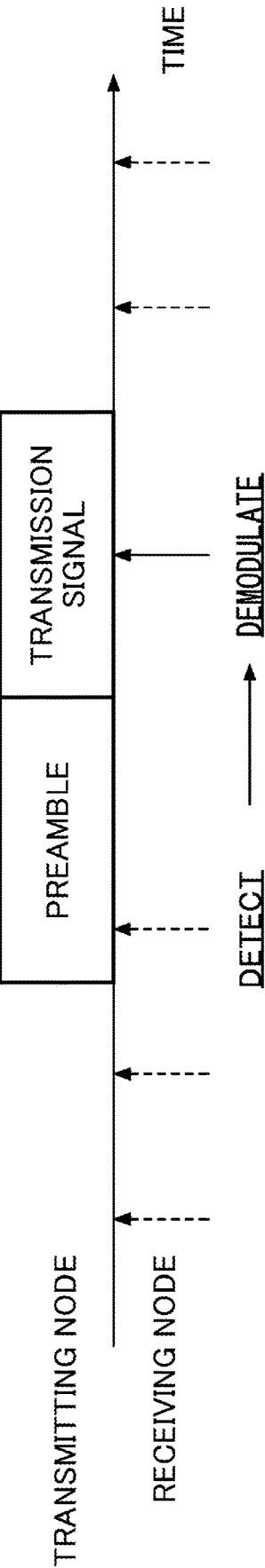
FIG. 5 illustrates an example (2) of transmission and reception in an embodiment of the present invention.

FIG. 5 is a diagram illustrating an example (2) of transmission and reception in an embodiment of the present invention. The procedure of the above-described control rule A2 is explained with reference to FIG. 5. In the above-described control rule A2, the operations of 1) to 4) indicated below may be performed.

1) As illustrated in FIG. 5, the transmitting node may add a preamble signal to the transmitting signal and transmit the transmitting signal. The transmitting signal may include at least one of a data signal, a control signal, and a reference signal. The transmitting node may start transmitting at any time.

2) When transmitting multiple signals continuously, if the gap between the transmission signals is less than or equal to a predetermined value, the transmitting node may not attach a preamble signal for transmission other than the first transmission. The predetermined value may be a threshold. The transmission timing of signals other than the first transmission may be determined based on the immediately preceding transmitted signal. For example, the transmission of the next signal may begin X milliseconds after the end of the immediately preceding transmitted signal.

3) The receiving node may perform detection of the preamble signal. The receiving node may determine that a preamble has been detected when the received power of the preamble signal is greater than or equal to a predetermined value.

4) When the receiving node detects the preamble signal, the receiving node may perform demodulation of the transmission signal. The receiving node may identify the resource of the transmission signal based on the detection result of the preamble signal. The receiving node may identify the resource or detection opportunity (for example, CORESET or search space) of the control signal based on the detection result of the preamble signal and perform blind detection of the control signal. Further, the receiving node may perform demodulation of the data signal when the receiving node detects the control signal. The receiving node may identify the resource of the data and/or the reference signal from the detection result of the control signal.

Figure 6:
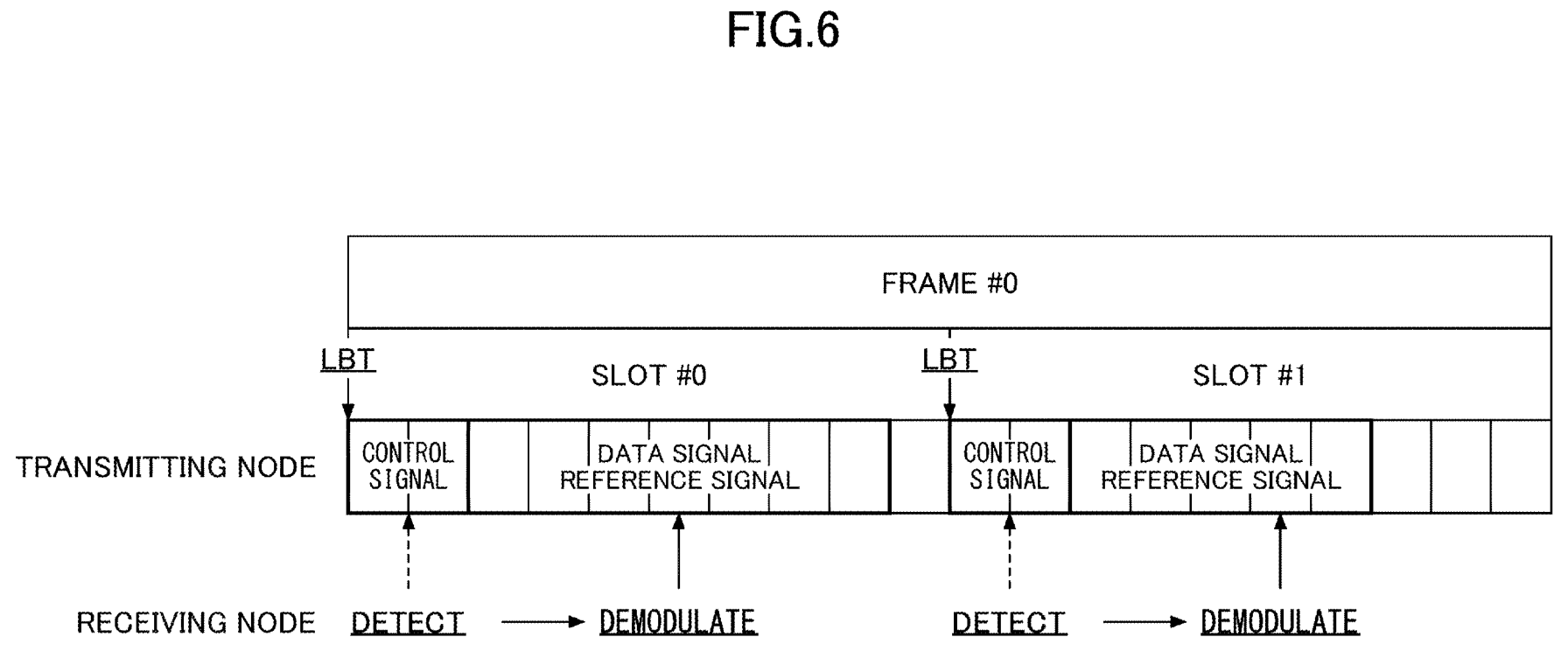

FIG. 6 is a diagram illustrating an example (3) of transmission and reception in an embodiment of the present invention. With reference to FIG. 6, the procedure of the above-described control rule B1 is explained. In the above-described control rule B1, the operations of 1) to 4) indicated below may be performed.

1) The transmitting node may transmit a transmission signal when the LBT is successful at a predetermined transmission timing. For example, as illustrated in FIG. 6, the LBT may be executed immediately before the slot transmitting the signal. The transmission signal may include at least one of a data signal, a control signal, and a reference signal. The predetermined transmission timing may be determined based on frames synchronized between the transmitting and receiving nodes. The LBT may perform power detection in a predetermined time interval immediately before transmitting the transmission signal and determine success when the received power is less than or equal to a predetermined value. The predetermined value may be a threshold value. If the LBT fails, the LBT may be executed again immediately before the predetermined transmission timing. Alternatively, the timing of executing the LBT repeatedly until the LBT succeeds may be defined in the specification or may be set or reported in advance by the receiving node. If the transmitting node performs the LBT again and succeeds, the transmitting node may transmit the same transmission signal as when the LBT fails or may transmit a different transmission signal than when the LBT fails.

2) When transmitting multiple transmission signals continuously, the transmitting node may not execute LBT except for the first transmission if the gap between the transmission signals is less than or equal to a predetermined value. That is, if the gap between the transmission signal and the next transmission signal is less than or equal to a predetermined value, the next transmission signal may be transmitted without executing LBT. The predetermined value may be a threshold. When the transmitting node continuously transmits multiple transmission signals, if the LBT is successful, the transmitting node may transmit without executing the LBT for a predetermined period of time. When multiple transmission signals are continuously transmitted, the transmission timing of signals other than the first transmission may be determined based on the immediately preceding transmitted signal. When multiple transmission signals are continuously transmitted, the transmission timing and transmission time of signals other than the first transmission may be instructed to the transmitting node or set in advance in the transmitting node, or reported to the receiving node or set in advance in the receiving node. For example, the transmission timing of a transmission other than the first transmission may be x symbols after the end of the immediately preceding transmitted signal, y slots after the end of the immediately preceding transmitted signal, z frames after the end of the immediately preceding transmitted signal, or a combination of x, y and z. For example, the transmission time length of a transmission other than the first transmission may be a length of the xth symbol to the Lth symbol per slot.

3) The receiving node may perform blind detection of the control signal. The resources or detection opportunities (for example, CORESET or search space) of the control signal may be defined in the specification or set or reported by the transmitting node. For example, in FIG. 6, the receiving node performs blind detection on control signals transmitted to the two symbols at the top of the slot.

4) When the receiving node detects the control signal, the receiving node may perform demodulation of the data signal. The receiving node may identify the resource of the data signal and/or the reference signal based on the detection result of the control signal. For example, in FIG. 6, when the receiving node detects the control signal to be transmitted to the two symbols at the top of the slot, the receiving node may perform demodulation of the subsequent data signal and/or the reference signal.

Figure 7:
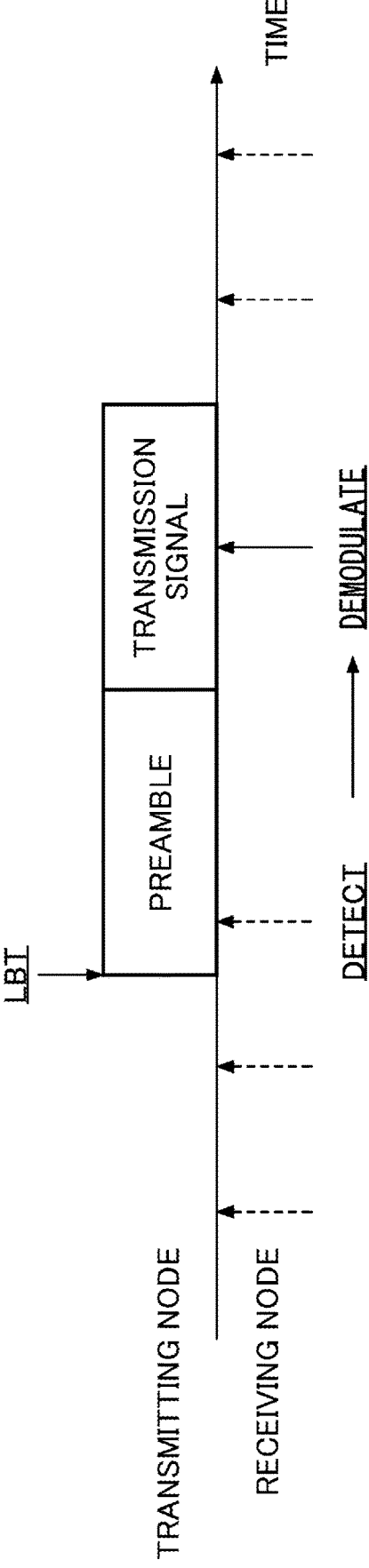
FIG. 7 illustrates an example (4) of transmission and reception in an embodiment of the present invention.

FIG. 7 is a diagram illustrating an example (4) of transmission and reception in an embodiment of the present invention. The procedure of the above-described control rule B2 is explained by using FIG. 7. In the above-described control rule B2, the operations of 1) to 4) indicated below may be performed.

1) The transmitting node may perform transmission by attaching a preamble signal to the transmitting signal when the LBT is successful. For example, as illustrated in FIG. 7, the LBT may be performed at some point immediately before transmitting the preamble signal. The transmission signal may include at least one of a data signal, a control signal, and a reference signal. The transmitting node may start LBT and transmission at any timing. The LBT may perform power detection at a predetermined time interval immediately before transmitting the preamble signal and determine success when the received power is less than or equal to a predetermined value. The predetermined value may be a threshold. If the LBT fails, the LBT may be executed again immediately before any transmission timing. Alternatively, the timing of executing the LBT repeatedly until the LBT succeeds may be defined in the specification or may be set or reported in advance by the receiving node. If the transmitting node performs the LBT again and succeeds, the transmitting node may transmit the same transmission signal as when the LBT fails or a different transmission signal than when the LBT fails.

2) When a transmitting node continuously transmits multiple signals, if the gap between the transmission signals is less than or equal to a predetermined value, the transmitting node may not attach a preamble signal for transmission other than the first transmission. The predetermined value may be a threshold. When the transmitting node continuously transmits multiple signals, if the gap between transmission signals is less than or equal to a predetermined value, the transmitting node may not perform LBT in transmissions other than the first transmission. The predetermined value may be a threshold. When the transmitting node continuously transmits multiple transmission signals, if the LBT is successful, the transmitting node may transmit without executing the LBT for a predetermined period of time. When multiple transmission signals are continuously transmitted, the transmission timing of signals other than the first transmission may be determined based on the immediately preceding transmitted signal. For example, transmission of the next signal may begin X milliseconds after the end of the previous transmission signal.

3) The receiving node may perform detection of the preamble signal. A receiving node may determine that a preamble has been detected when the received power of the preamble signal is greater than or equal to a predetermined value.

4) The receiving node may perform demodulation of the transmission signal when the receiving node detects a preamble signal. The receiving node may identify the resource of the transmission signal based on the detection result of the preamble signal. The receiving node may identify the resource or detection opportunity (for example, CORESET or search space) of the control signal based on the detection result of the preamble signal and perform blind detection of the control signal. Further, the receiving node may perform demodulation of the data signal when the receiving node detects the control signal. The receiving node may identify the resource of the data and/or the reference signal from the detection result of the control signal.

In the above-described control rules A1, A2, B1, and B2, it is necessary to examine the feedback. For example, with regard to CSI (Channel State Information) reporting, it is necessary to examine the presence or absence of a trigger and the method of triggering; the definition, the determination method, and the reporting method of measurement signals; and the determination method of the report content and the procedure of transmitting the report.

In a system in which the transmitting communication apparatus autonomously determines the resources for transmitting data to the receiving communication apparatus, such as the base station or the terminal 20, for example, in a system in which the above-described control rules A1, A2, B1, and B2 are applied, any of the communication apparatuses indicating below in 1) to 4) is proposed.

1) Measuring predetermined information based on a signal received from a communication apparatus and transmitting information relating to the measurement to the communication apparatus.

2) A signal is transmitted to a communication apparatus, and information relating to measurements based on the transmission signal is received from the communication apparatus.

3) Based on the signal received from the communication apparatus, a signal relating to the measurement of predetermined information is transmitted to the communication apparatus.

4) Transmits a signal to a communication apparatus, and receives from the communication apparatus a signal relating to the measurement of predetermined information corresponding to the transmission signal.

The methods indicated in 1) and 2) above are referred to as CSI measurement and reporting, and the signal used may be referred to as CSI-RS. The communication apparatus that receives the information relating to the measurement may be the communication apparatus that transmits the data, but is not limited thereto, and the communication apparatus that receives the data may receive the information relating to the measurement.

The methods indicated in 3) and 4) above may be referred to as signal requests for CSI measurement, and the signal used may be referred to as SRS (Sounding reference signal). The communication apparatus that receives the signal relating to measurement of the predetermined information may be the communication apparatus that transmits the data, but is not limited thereto, and the communication apparatus that receives the data may receive the signal relating to measurement of the predetermined information.

With the above communication apparatus, in a system in which the base station 10 or the terminal 20 autonomously selects a resource for DL, UL, or SL transmission, it is possible to acquire information relating to the channel state necessary for determining the parameters, etc., to be used for transmission. That is, it is possible to select an appropriate transmission parameter, and improvement in frequency utilization efficiency and transmission quality can be achieved.

In the embodiment of the present invention, a control rule by which a communication apparatus transmitting a signal autonomously selects a resource, can be applied between any of the communication apparatuses (for example, UL, DL, or SL), and, therefore, hereinafter, the base station 10 or the terminal 20 is also described as, for example, a transmitting node, a receiving node, or a communication apparatus.

Note that the "resource", "time interval", and "window" may or may not include an LBT interval.

The information to be measured or information relating to the measurement may be any of the following 1) to 3).

1) Channel state. The channel state may be information relating to the target frequency, the channel usage status, the interference power values or levels, other detectable communication apparatuses, and propagation characteristic measurement values, such as information relating to CQI (Channel quality indicator), RI (Rank indicator), PMI (Precoding matrix indicator), LI (Layer indicator), RSRP (Reference Signal Received Power), RSRQ (Reference Signal Received Quality), and, RSSI (Received Signal Strength Indicator), LOS (Line of sight), or NLOS (Non line of sight).

2) Information relating to the position. Information relating to the position may be, for example, GNSS (Global Navigation Satellite System) information, the latitude and longitude, the altitude, the area formation angle, information that indicates which section when the plane is divided into predetermined sections (zones), and the signal arrival angle.

3) Measurement target. The measurement target may be, for example, the type, the sequence, the ID, or the resource of the signal, or the measurement target may be information indicating which measurement target is the basis for measuring the corresponding CSI.

Hereafter, the above information to be measured or the information relating to the measurement is described as "CSI", but is not limited thereto. The CSI report may include the above information to be measured or the information relating to the measurement.

A certain node transmits a CSI request, and the node that receives the CSI request reports the CSI to the node that has transmitted the CSI request. The method for requesting CSI may be any of 1) to 3) illustrated below.

1) A CSI request may be transmitted in a signal relating to data transmission. The CSI request may be included in a data signal, a control signal, a reference signal, or a preamble signal. For example, the control signal may include information corresponding to a CSI request. For example, a CSI request may be transmitted by a sequence of reference signals or a sequence of preamble signals.

2) Transmission of a CSI request without data transmission may be defined. A control signal, a reference signal, or a preamble signal including a CSI request may be transmitted. A CSI request may be transmitted by the same transmission procedure as that of the data transmission to which the above-described control rule A1, A2, B1, or B2 is applied. In the case of the above-described control rule B1 or B2, LBT may be performed prior to the transmission of a signal including a CSI request.

3) When a predetermined condition is satisfied, a CSI report may be triggered. For example, if data is transmitted from one node X to another node Y and a CSI request is received by node Y during the data transmission, node Y may trigger a CSI report to node X and transmit a CSI report to node X. For example, data may be transmitted from one node X to another node Y, and node Y may trigger a CSI report to node X and transmit the CSI report to node X. That is, the above CSI report may be triggered without an explicit CSI request.

For example, if data is transmitted from one node X to another node Y and any of the following conditions a), b), and c) is satisfied, node Y may trigger a CSI report to node X and transmit a CSI report to node X.

a) If data reception or decoding fails a predetermined number of times or for a predetermined time.

b) If the amount of resources for data transmission, MCS (Modulation and coding scheme), or TBS (Transport block size) exceeds or falls below a predetermined value.

c) If data transmission in a predetermined time resource is reported in advance.

Figure 8:
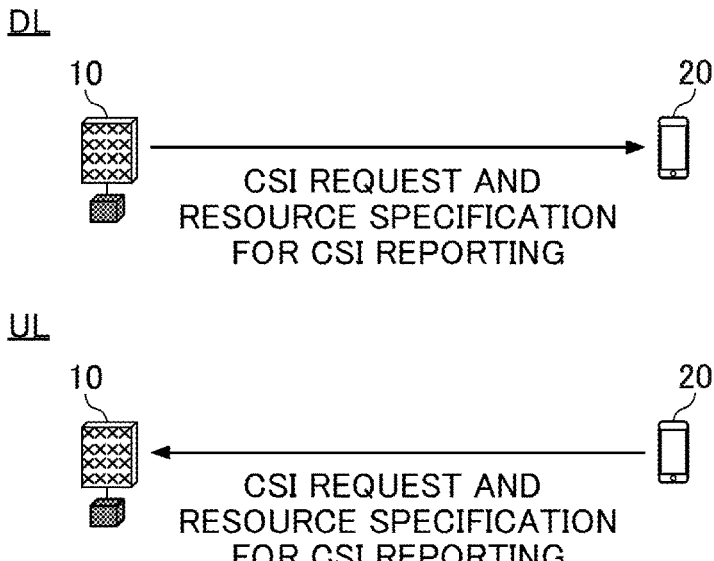
FIG. 8 illustrates an example (1) of resources for CSI reporting in an embodiment of the present invention.

FIG. 8 illustrates an example (1) of a resource for CSI reporting in an embodiment of the present invention. As illustrated in FIG. 8, a node requesting CSI may specify a resource for CSI reporting to a node reporting CSI. The specified resource may be indicated in a predetermined time unit (e.g., slot) or in a predetermined time, frequency, or code unit (for example, a symbol, PRB, cyclic shift, and orthogonal cover code (OCC) index).

A node requesting CSI may specify a predetermined resource, i.e., at least one of the time, the frequency, the code, the space, and the like, as a resource for CSI reporting based on a predetermined timing. For example, the predetermined timing may be a synchronous timing and/or a CSI request transmission timing in the above-described control rules A1 and B1, or may be a CSI request transmission timing in the above-described control rules A2 and B2.

Information indicating resources for CSI reporting may be shared with other nodes, and other nodes may use resources other than those resources. This information may be shared only among the terminals 20 associated with the beams of the same base station 10, or information relating to the beams may also be shared among such terminals 20. With respect to multiple nodes, information indicating resources for CSI reporting by a single signal may be shared.

Based on the timing of the beams of the nodes reporting CSI, a node requesting CSI may specify a predetermined resource.

The specification of resources for CSI reporting may be made by a data signal, a control signal, a reference signal, or a preamble signal (in the cases where the above-described control rules A2 and B2 are applied). The specification of resources for CSI reporting may be made by a data signal, a control signal, a reference signal, or a preamble signal corresponding to the CSI reporting (in the cases where the above-described control rules A2 and B2 are applied).

Figure 9:
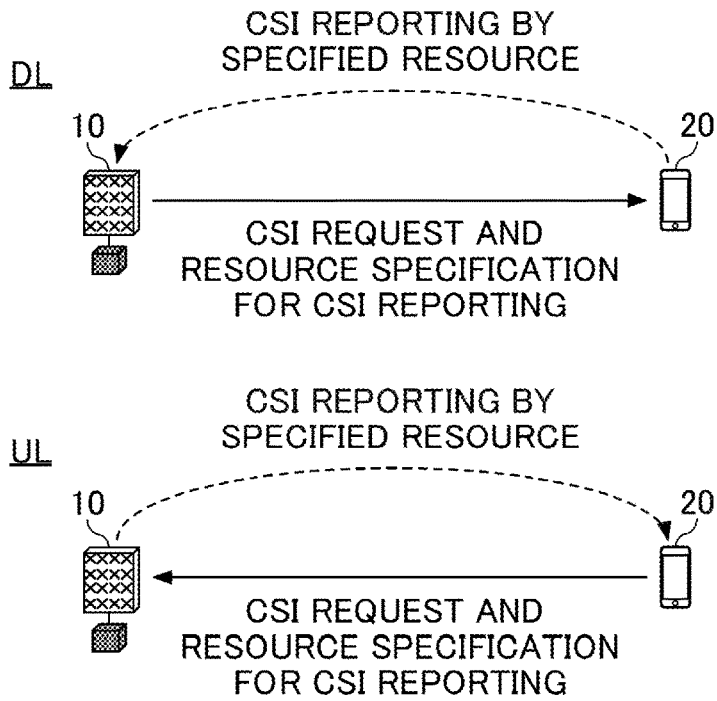
FIG. 9 illustrates an example (2) of resources for CSI reporting in an embodiment of the present invention.

FIG. 9 is a diagram illustrating an example (2) of resources for CSI reporting in an embodiment of the present invention. As illustrated in FIG. 9, a node reporting CSI may transmit a CSI report to a node requesting CSI by using a resource specified by a node requesting CSI. A node reporting CSI may transmit a CSI report to a node requesting CSI by always using a resource specified by the node requesting CSI.

Further, a node reporting CSI may use other resources to transmit a CSI report to a node requesting CSI if the resource specified by the node requesting CSI is not available for use. For example, when there are other plans for transmission or reception in the same time resource as the resource specified by a node reporting CSI, it may be determined that the node reporting CSI cannot use the specified resource. For example, in the above-described control rule A2 or B2, when it is detected by the preamble signal detection and decoding of the associated signal, that at least some of the resources specified by the node requesting CSI are used by other nodes, the node reporting CSI may determine that the specified resources are unavailable for use. For example, in the above-described control rule A2 or B2, when it is determined by the preamble signal detection and decoding of the associated signal, that at least some of the resources specified by the node requesting CSI will perform a reception operation, and when reception and transmission cannot be simultaneously performed, the node reporting CSI may determine that the specified resources are unavailable for use. For example, if the LBT detects the signal of a node requesting another CSI and transmission cannot be performed in the resource specified by the node requesting CSI, the node reporting CSI may determine that the specified resources are unavailable for use. Further, the node reporting CSI may operate to transmit the CSI report by a predetermined timing, and cancel the CSI report when the CSI report cannot be transmitted by the predetermined timing.

Further, the node reporting CSI may not use any of the reported resources and may not perform the CSI report if the reported resources are unavailable for use.

The node reporting CSI may autonomously determine the resources for the CSI report. For example, the resources for the CSI report may be any resource. That is, the timing of the CSI report need not be limited.

Figure 10:
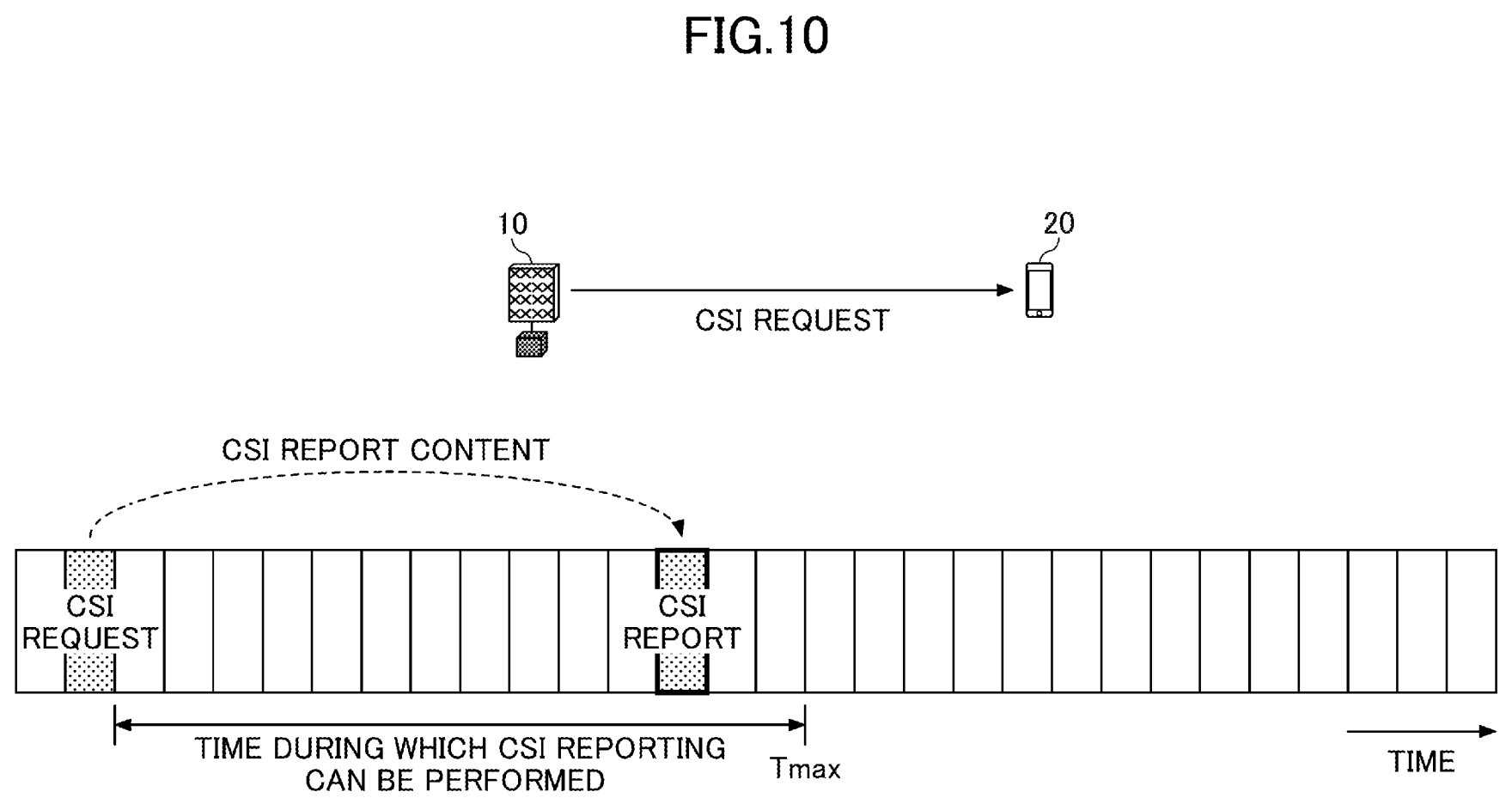

FIG. 10 is a diagram illustrating an example of a CSI reporting operation in an embodiment of the present invention. As illustrated in FIG. 10, when a data receiving node autonomously determines a resource for CSI reporting, CSI reporting may be performed by a predetermined timing Tmax. Tmax may be defined by the specification, may be determined by upper layer parameters, may be determined by MAC-CE (Media Access Control-Control Element), or may be determined by control signals (e.g., DCI (Downlink Control Information) or UCI (Uplink Control Information)) or preamble signals.

Tmax may be a value that differs depending on the case. For example, Tmax may be a value that is different for each data receiving node, a value that is different for each frequency (for example, bands, carriers, and cells), a value that is different for each service type or request (for example, eMBB (enhanced Mobile Broadband), URLLC (Ultra-Reliable and Low Latency Communications)), or a value that is different for each priority level (for example, an index indicating the priority level, a value indicating the priority level, the priority level in a PHY layer, the priority level in a MAC layer). Further, Tmax may be applied based on the timing when CSI is requested or the timing when CSI is triggered.

Further, Tmax may be determined based on parameters relating to LBT. That is, the Tmax may be determined on the basis of how many timings at which transmission can be started are there after receiving a CSI request. The parameter relating to the LBT may be the time width of the LBT or the capability relating to the LBT.

A resource group for the CSI reporting resource is defined in advance, and the node reporting CSI from the resource group may determine the CSI reporting resource. The resource group may be subjected to TDM or FDM (frequency division multiplexing) with the data transmission resource group.

A node requesting CSI reports a predetermined resource candidate for CSI reporting, and a node reporting CSI may autonomously determine a resource for CSI reporting from among the resource candidates.

The resource candidate may be a time window for CSI reporting, and a node reporting CSI may autonomously select a resource for CSI reporting in the time window as described with reference to FIG. 10.

The resource candidate may be multiple time and frequency resources for CSI reporting, and the node reporting CSI may autonomously select resources for CSI reporting in the plural time and frequency resources for CSI reporting, as described with reference to FIG. 10.

The node reporting CSI may perform CSI reporting for the resources selected from the resource candidates as described with reference to FIG. 10.

A resource group for CSI reporting may be defined or set in advance. The resource group may be set from the base station 10 to the terminal 20, or a common setting may be predetermined in the system. The CSI requesting resource or the CSI measurement signal resource may be associated with the CSI reporting resource, or the CSI reporting resource may be determined based on the CSI requesting resource or the CSI measurement signal resource used. Further, the operations of the node requesting CSI and the node reporting CSI described in FIGS. 9 and 10 may be applied.

The resource group that can be used as the CSI requesting resource or the CSI measurement signal resource may be defined so as not to overlap with the resource group that can be used for CSI reporting. The resource group that can be used for CSI reporting may be subjected to TDM or FDM with the CSI requesting resource group or the CSI measurement signal resource group.

The node requesting CSI may specify the CSI measurement signals for the node reporting CSI. With respect to the periodicity of the CSI measurement signals, the CSI measurement signals may be transmitted non-periodically for a predetermined CSI report.

The CSI measurement signals may also be transmitted semi-persistently, triggered by the signal that activates the CSI measurement signals. A predetermined CSI request may be an activation signal, the periodic transmission of the CSI measurement signals may continue for a predetermined number of times or for a predetermined time, or the periodic transmission of the CSI measurement signals may continue until the transmission of the deactivation signal is performed. Further, the CSI measurement signals may be periodically transmitted independently of the signal requesting CSI.

The node requesting CSI may specify at least one of a predetermined resource, i.e., time, frequency, sign, space, and the like, as the resource of the CSI measurement signal based on a predetermined timing. For example, the predetermined timing may be a synchronous timing and/or a CSI request transmission timing in the above-described control rules A1 and B1, or a CSI request transmission timing in the above-described control rules A2 and B2.

Information indicating the CSI measurement signal resource may be shared with other nodes, and other nodes may use resources other than those resources indicated by the information. The information may be shared only among the terminals associated with the beams of the same base station 10, or information relating to the beams may also be shared among the terminals 20. For multiple nodes, information indicating the CSI measurement signal resource may be shared by a single signal.

Based on the timing of the beam of the node reporting CSI, the node requesting CSI may specify the CSI measurement signal resource.

The CSI measurement signal resource may be reported collectively to multiple nodes, or the measurement of the CSI may be performed based on the signal in a resource common among the reported nodes. Moreover, the CSI measurement signal may always be included in the data signal, the control signal, the reference signal, or the preamble signal corresponding to the CSI request.

As a method of reporting the CSI measurement signal resource, the specification of the resource may be made by one of a data signal, a control signal, a reference signal, or a preamble signal. The CSI measurement signal resource may be reported by one of a data signal, a control signal, a reference signal, or a preamble signal corresponding to the CSI request. The CSI measurement signal resource may be reported by one of a data signal, a control signal, a reference signal, or a preamble signal not including a CSI request.

A node reporting CSI may autonomously determine the CSI measurement signal. A data signal, a control signal, a reference signal, or a preamble signal received from a node requesting CSI may be used as the CSI measurement signal. Among the data signal, the control signal, the reference signal, or the preamble signal received from a node requesting CSI, the CSI measurement signal that is autonomously determined to be the signal received after a predetermined timing Tcsi, may be limited. Tcsi may be defined in the specification, may be provided by an upper layer parameter, may be determined in MAC-CE, may be specified in control signals (e.g., DCI), or may be specified in preamble signals.

Tcsi may be a value that differs depending on the case. For example, Tcsi may be a value that is different for each data receiving node, a value that is different for each frequency (for example, bands, carriers, and cells), a value that is different for each service type or request (for example, eMBB, URLLC), or a value that is different for each priority level (for example, an index indicating the priority level, a value indicating the priority level, the priority level in a PHY layer, the priority level in a MAC layer). Further, Tcsi may be applied based on the timing when CSI is requested or the timing when CSI is triggered.

The CSI measurement signal may be defined or set in advance. The CSI measurement signal may be set from the base station 10 to the terminal 20, or a common setting may be predetermined in the system. The CSI requesting resource or the CSI measurement signal resource may be associated with the CSI reporting resource, or the CSI reporting resource may be determined based on the CSI requesting resource or the CSI measurement signal resource used.

Further, the resource for transmitting the CSI measurement signals may be set in advance for each communication node, and the CSI measurement signals may be periodically transmitted independently of the CSI requests.

A node requesting CSI may specify CSI report content for a node reporting CSI. Which one of the above channel state, position information, or measurement target is requested as CSI report content may be specified. The CSI report content may be specified by a data signal, a control signal, a reference signal, or a preamble signal. Further, the CSI report content may be specified by a data signal, a control signal, a reference signal, or a preamble signal that corresponds to or requests the CSI report.

The node reporting CSI may autonomously determine the CSI report content. The CSI report content may be determined based on the communication status with the node requesting CSI. For example, if the most recent data reception had failed, the CQI may be determined as the CSI report content. For example, if the most recent data reception was performed by multilayer communication, the RI or PMI may be determined as the CSI report content. Further, information indicating the CSI report content may be reported accompanying the CSI reporting.

The CSI report content may be defined or set in advance. The CSI report content may be set from the base station 10 to the terminal 20, or a common setting may be defined in the system in advance. The resource for the CSI request, the resource for the CSI measurement signal or the resource for the CSI report may be associated with the CSI report content, and the CSI report content may be determined based on the resource used.

If the node reporting CSI has data that is desired to be transmitted, the data and the CSI report may be transmitted together. Further, if the node reporting CSI has data that is desired to be transmitted, the data and the CSI report may be transmitted separately or either one may be transmitted with priority over the other.

Figure 11:
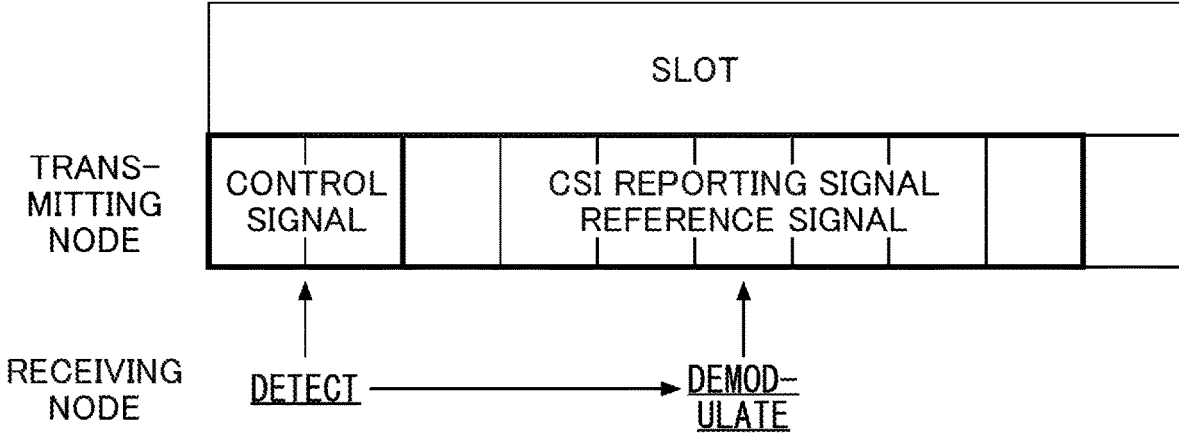
FIG. 11 illustrates an example (1) of CSI report transmission and reception in an embodiment of the present invention.

FIG. 11 is a diagram illustrating an example (1) of CSI report transmission/reception in an embodiment of the present invention. The transmission procedure of the CSI report may be the same as that of data transmission. That is, the procedure for transmitting the data signal, the control signal, the reference signal, and the preamble signal (when the above-described control rules A2 and B2 are applied) is the transmission procedure for data transmission, and as illustrated in FIG. 11, the CSI report is transmitted instead of the data signal, and the CSI reporting signal, the control signal, the reference signal, and the preamble signal may be transmitted. When the above-described control rules B1 and B2 are applied, LBT may be performed before signal transmission.

Figure 12:
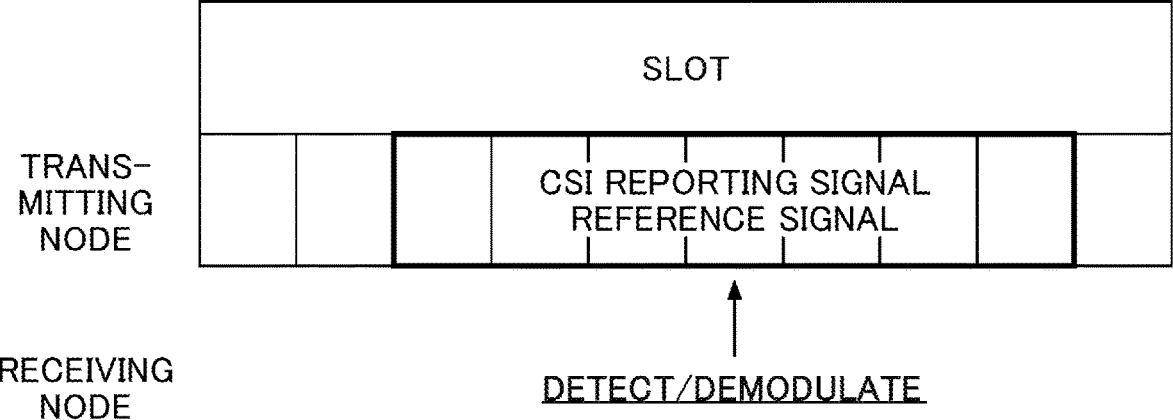
FIG. 12 illustrates an example (2) of CSI report transmission and reception in an embodiment of the present invention.

FIG. 12 is a diagram illustrating an example (2) of CSI report transmission/reception in an embodiment of the present invention. The transmission procedure of the CSI report may be different from the data transmission procedure. That is, a CSI reporting signal may be defined. As illustrated in FIG. 12, a CSI reporting signal, a preamble signal (when the above-described control rules A2 and B2 are applied) may be transmitted at a specified resource without a control signal for reception. Further, when the above-described control rules B1 and B2 are applied, LBT may not be performed before the signal transmission. For example, resources reported as CSI reporting resources may not be used by other nodes. Further, LBT may not be performed if, for example, there is transmission of a node requesting CSI or a node reporting CSI, continuously or within a predetermined time gap, before a CSI reporting resource.

A node requesting a CSI may assume that a CSI report is transmitted from a CSI reporting node on a specified CSI reporting resource. Further, a node requesting a CSI may assume that a CSI report is transmitted by a predetermined timing. The predetermined time may be based on the Tmax described above.

The node requesting CSI may assume that the CSI report will be transmitted from the node reporting CSI on the specified CSI reporting resource if the predetermined conditions are satisfied. Further, the node requesting CSI may assume that the CSI report will be transmitted by the predetermined timing if the predetermined conditions are satisfied.

A node transmits a signal request, and the node receiving the signal request transmits the corresponding signal to the node that transmitted the signal request. The signal transmitted in response to the signal request is described as SRS, but is not limited to SRS. The method of requesting SRS transmission (hereafter also referred to as "SRS request") may be any of the following 1) to 3).

1) An SRS request may be transmitted in a signal relating to a data transmission. The SRS request may be included in a data signal, a control signal, a reference signal, or a preamble signal. For example, the control signal may include information corresponding to the SRS request. For example, the SRS request may be transmitted by a sequence of reference signals or a sequence of preamble signals.

2) The transmission of SRS requests without data transmission may be defined. A control signal, a reference signal, or a preamble signal including an SRS request may be transmitted. A CSI request may be transmitted by the same transmission procedure as the data transmission to which the above-described control rule A1, A2, B1, or B2 is applied. In the case of the above-described control rule B1 or B2, the LBT may be performed prior to the transmission of the signal including a SRS request.

3) SRS transmission may be triggered if predetermined conditions are satisfied. For example, if data is transmitted from one node X to another node Y, and an SRS request is received by the node Y during the data transmission, the node Y may trigger SRS transmission to the node X and transmit SRS to the node X. For example, data may be transmitted from one node X to another node Y and the node Y may trigger SRS transmission to the node X and transmit SRS to the node X. That is, the above SRS transmission may be triggered without an explicit SRS request.

For example, if data is transmitted from one node X to another node Y and any of the following conditions a), b), or c) is satisfied, the node Y may trigger an SRS transmission to the node X and transmit an SRS to the node X.

a) If data reception or decoding fails a predetermined number of times or for a predetermined time.

b) If the amount of resources for data transmission, MCS (Modulation and coding scheme), or TBS (Transport block size) exceeds or falls below a predetermined value.

c) When data transmission at a predetermined time resource is reported in advance A node requesting SRS transmission may specify a resource for SRS transmission to the node transmitting SRS. The specified resource may be indicated in a predetermined time unit (e.g., a slot) or in a predetermined time, frequency, or code unit (e.g., a symbol, PRB, a cyclic shift, and OCC index).

A node requesting SRS transmission may specify a resource for SRS transmission to the node transmitting the SRS. With respect to the periodicity of SRS, SRS may be transmitted non-periodically for a predetermined SRS request.

Further, SRS may be transmitted semi-persistently, triggered by a signal that activates SRS transmission. A predetermined SRS request may be an activation signal, the periodic transmission of SRS may continue for a predetermined number of times or for a predetermined time, or the periodic transmission of SRS may continue until the transmission of the deactivation signal is performed.

A node requesting SRS transmission may specify at least one of a predetermined resource, i.e., the time, the frequency, the code, and the space, as a resource for SRS based on a predetermined timing. For example, the predetermined timing may be a synchronization timing and/or a transmission timing of SRS requests in the above-described control rules A1 and B1, or the transmission timing of SRS requests in the above-described control rules A2 and B2.

Information indicating resources for SRS transmission may be shared with other nodes, and other nodes may use resources other than those resources. This information may be shared only among the terminals 20 associated with the beams of the same base station 10, or information relating to the beams may also be shared among such terminals 20. With respect to multiple nodes, information indicating resources for SRS transmission by a single signal may be shared.

Based on the timing of the beams of the nodes transmitting SRS, a node requesting SRS may specify a predetermined resource. Further, information indicating SRS requests and resources for SRS transmission may be collectively reported to multiple nodes, or resources that are orthogonal among the reported nodes may be specified.

The usage may be associated with the resource for SRS transmission, and parameters, resources, operations, etc., may differ based on the associated usage. For example, the usage may be defined for each CSI type, such as CSI measurement, beam control for nodes requesting SRS, beam control for nodes transmitting SRS, etc.

The specification of resources for SRS transmission may be performed by a data signal, a control signal, a reference signal, or a preamble signal (when the above-described control rules A2 and B2 are applied). The specification of resources for SRS transmission may be performed by a data signal, a control signal, a reference signal, or a preamble signal corresponding to the SRS request (when the above-described control rules A2 and B2 are applied).

The node transmitting the SRS may transmit the SRS to the node requesting the SRS, by using the resource specified by the node requesting the SRS. The node transmitting the SRS may transmit the SRS to the node requesting the SRS, by always using the resource specified by the node requesting the SRS.

Further, a node transmitting SRS may use other resources to transmit a SRS to a node requesting SRS if the resource specified by the node requesting SRS is not available for use. For example, when there are other plans for transmission or reception in the same time resource as the resource specified by a node requesting SRS, it may be determined that the node transmitting SRS cannot use the specified resource. For example, in the above-described control rule A2 or B2, when it is detected by the preamble signal detection and decoding of the associated signal, that at least some of the resources specified by the node requesting SRS are used by other nodes, the node transmitting SRS may determine that the specified resources are unavailable for use. For example, in the above-described control rule A2 or B2, when it is determined by the preamble signal detection and decoding of the associated signal, that at least some of the resources specified by the node requesting SRS will perform a reception operation, and when reception and transmission cannot be simultaneously performed, the node transmitting SRS may determine that the specified resources are unavailable for use. For example, if the LBT detects the signal of another node and transmission cannot be performed in the resource specified by the node requesting SRS, the node transmitting SRS may determine that the specified resources are unavailable for use. Further, the node transmitting SRS may operate to transmit the SRS by a predetermined timing, and cancel the SRS transmission when the SRS report cannot be transmitted by the predetermined timing.

Further, the node transmitting the SRS may not use any of the reported resources and may not transmit the SRS transmission if the reported resources are unavailable for use.

The node transmitting the SRS may autonomously determine the resources for transmitting the SRS. For example, the resource for SRS transmission may be any resource. That is, there need be no restriction on the timing of SRS transmission.

When the node transmitting the SRS autonomously determines the resources for SRS transmission, the SRS transmission may occur by a predetermined timing Tmax. Tmax may be defined by the specification, may be determined by upper layer parameters, may be determined by MAC-CE, or may be determined by a control signal (e.g., DCI, UCI, or a preamble signal).

Tmax may be a value that differs depending on the case. For example, Tmax may be a value that is different for each node transmitting SRS, a value that is different for each frequency (for example, bands, carriers, and cells), a value that is different for each service type or request (for example, eMBB, URLLC), or a value that is different for each priority level (for example, an index indicating the priority level, a value indicating the priority level, the priority level in a PHY layer, the priority level in a MAC layer). Further, Tmax may be applied based on the timing when SRS is requested or the timing when SRS is triggered.

Further, Tmax may be determined based on parameters relating to LBT. That is, the Tmax may be determined on the basis of how many timings at which transmission can be started are there after receiving a SRS request. The parameter relating to the LBT may be the time width of the LBT or the capability relating to the LBT.

A resource group for the SRS transmission resources is defined in advance, and the node transmitting the SRS from the resource group may determine the SRS transmission resource. The resource group may be subjected to TDM or FDM with the data transmission resource group.

The usage may be associated with the resource for SRS transmission, and parameters, resources, operations, etc., may differ based on the associated usage. For example, the usage may be defined for each CSI type, such as CSI measurement, beam control for nodes requesting SRS, beam control for nodes transmitting SRS, etc. Further, a resource group for SRS transmission resources may be defined in advance, and the nodes transmitting SRS from the resource group may determine the SRS transmission resources, and the resource group may be subjected to TDM or FDM with the data transmission resource group.

A node requesting SRS reports predetermined resource candidates for SRS transmission, and a node transmitting SRS may autonomously determine a resource for SRS transmission from among the resource candidates.

The resource candidate may be a time window for SRS transmitting, and a node transmitting SRS may autonomously select a resource for SRS transmitting as in the operation of referring to Tmax in the time window.

The resource candidate may be plural time and frequency resources for SRS transmitting, and the node transmitting SRS may autonomously select resources for SRS transmitting as in the operation of referring to Tmax in the plural time and frequency resources.

The node transmitting SRS may perform SRS transmitting as in the operation of referring to Tmax, for the resources selected from the resource candidates.

A resource group for SRS transmitting may be defined or set in advance. The resource group may be set from the base station 10 to the terminal 20, or a common setting may be predetermined in the system. The SRS requesting resource or the SRS transmitting resource may be associated, or the SRS transmitting resource may be determined based on the SRS requesting resource used. Further, the operations of the node requesting SRS and the node transmitting SRS described above may be applied.

The resource group that can be used as the SRS requesting resource may be defined so as not to overlap with the resource group that can be used for SRS transmitting. The resource group that can be used for SRS transmitting may be subjected to TDM or FDM with the SRS requesting resource group.

The transmission procedure of SRS may be the same as that of data transmission. That is, transmitting data signals, control signals, reference signals, and preamble signals (when the above-described control rules A2 and B2 are applied) is the transmission procedure for data transmission, and SRS may be transmitted in place of or in addition to data signals, and SRS, control signals, reference signals, and preamble signals may be transmitted. Further, when the above-described control rules B1 and B2 are applied, LBT may be performed before signal transmission.

The transmission procedure of SRS may be different from that of data transmission. That is, a signal for SRS transmission may be defined. SRS, preamble signals (when the above-described control rules A2 and B2 are applied) may be transmitted at a specified resource without a control signal for reception. Further, when the above-described control rules B1 and B2 are applied, LBT may not be performed before signal transmission. For example, resources reported as resources for SRS transmission may not be used by other nodes. Further, LBT may not be performed if, for example, there is transmission of a node requesting SRS or a node transmitting SRS, continuously or within a predetermined time gap, before the SRS transmission resource.

A node requesting SRS may assume that SRS is transmitted from a node transmitting SRS on a specified resource for SRS transmission. Further, a node requesting SRS may assume that SRS is transmitted by a specified timing. The predetermined timing may be based on the Tmax described above.

The node requesting the SRS may assume that the SRS is transmitted from the node transmitting the SRS with the specified resource for SRS transmission if the predetermined conditions are satisfied. Further, the node requesting the SRS may assume that the SRS is transmitted by the predetermined timing if the predetermined conditions are satisfied.

The node requesting the SRS may perform the CSI measurement based on the most recent X number of SRS, among the SRS received from the node transmitting the same SRS. Further, the node requesting the SRS may perform the CSI measurement based on the SRS received in the most recent $T_{SRS}$ time, among the SRS received from the node transmitting the same SRS.

The node requesting the SRS may perform the predetermined CSI measurement based on the received SRS. The node requesting the SRS may autonomously determine the CSI measurement content. The CSI measurement content may be the CSI reported to the node transmitting the SRS accompanying the SRS request. The CSI measurement content may be defined or set in advance.

The CSI measurement content may be set from the base station 10 to the terminal 20, or a common setting may be predetermined in the system. The SRS request resource or the SRS transmission resource may be associated with the CSI measurement content, or the CSI measurement content may be determined based on the resource used. Further, the CSI measurement content may be reported from the node transmitting the SRS to the node requesting the SRS.

According to the above example, in a system in which the base station 10 or the terminal 20 autonomously selects resources for DL, UL, or SL transmission, the operations relating to CSI measurement and reporting, and SRS requests and transmissions, can be clarified.

That is, in a wireless communication system in which the resources to be used are autonomously determined, the channel state is measured and the measurement results are reported so that transmission quality can be improved.

(Apparatus Configuration)

Next, a functional configuration example of the base station 10 and the terminal 20 that execute the above-described processes and operations, will be described. The base station 10 and the terminal 20 include functions for executing the above-described embodiments. However, each of the base station 10 and the terminal 20 may have only one of the proposed functions of the embodiments.

<Base Station 10>

Figure 13:
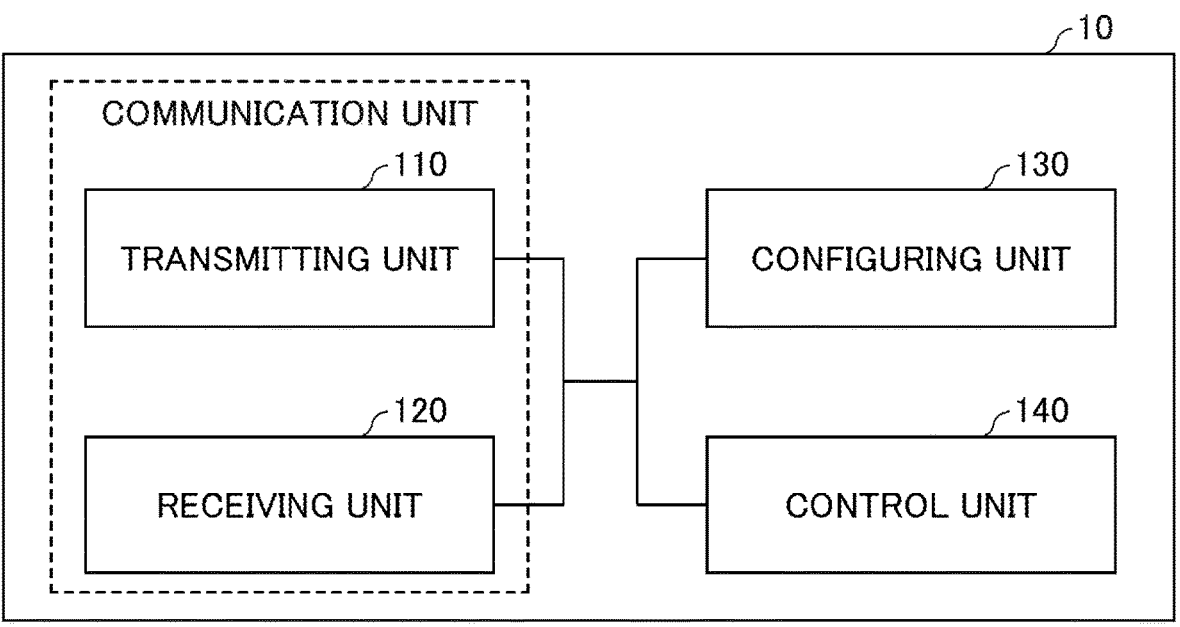
FIG. 13 illustrates an example of the functional configuration of a base station 10 in an embodiment of the present invention.

FIG. 13 is a diagram illustrating an example of a functional configuration of the base station 10. As illustrated in FIG. 13, the base station 10 includes a transmitting unit 110, a receiving unit 120, a configuring unit 130, and a control unit 140. The functional configuration illustrated in FIG. 13 is only an example. As long as the operations according to the embodiment of the present invention can be executed, the functional division and the name of the functional unit may be any functional division and name. The transmitting unit 110 and the receiving unit 120 may be referred to as a communication unit.

The transmitting unit 110 includes a function of generating signals to be transmitted to the terminal 20, and transmitting the signals in a wireless manner. The receiving unit 120 includes a function of receiving various signals transmitted from the terminal 20, and acquiring, for example, information of a higher layer from the received signals. Further, the transmitting unit 110 has a function of transmitting NR-PSS, NR-SSS, NR-PBCH, and DL/UL control signals, DL data, etc., to the terminal 20. Further, the transmitting unit 110 transmits configuration information, etc., described in the embodiments.

The configuring unit 130 stores pre-configured configuration information and various kinds of configuration information to be transmitted to the terminal 20, in a storage device, and reads these pieces of information from the storage device as necessary. The control unit 140 performs control, etc., of the entire base station 10, for example, including control relating to signal transmission and reception and control relating to LBT. Note that a functional unit relating to signal transmission in the control unit 140, may be included in the transmitting unit 110, and a functional unit relating to signal reception in the control unit 140, may be included in the receiving unit 120. Further, the transmitting unit 110 and the receiving unit 120 may be referred to as a transmitter and a receiver, respectively.

<Terminal 20>

Figure 14:
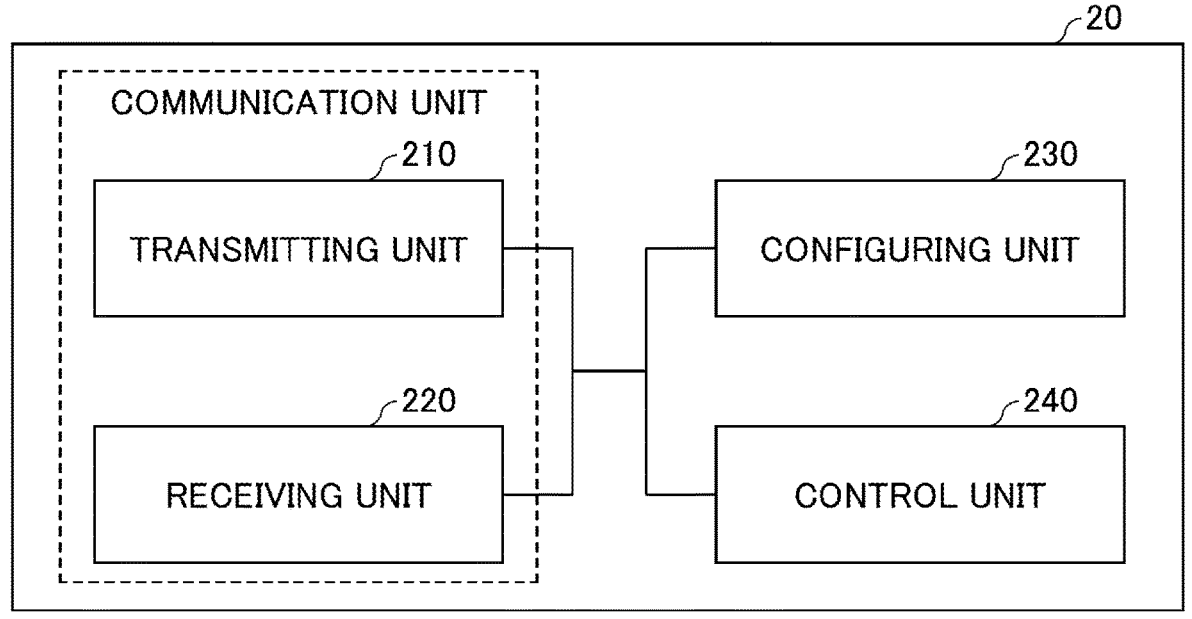
FIG. 14 illustrates an example of the functional configuration of the terminal 20 in the embodiment of the present invention.
Figure 15:
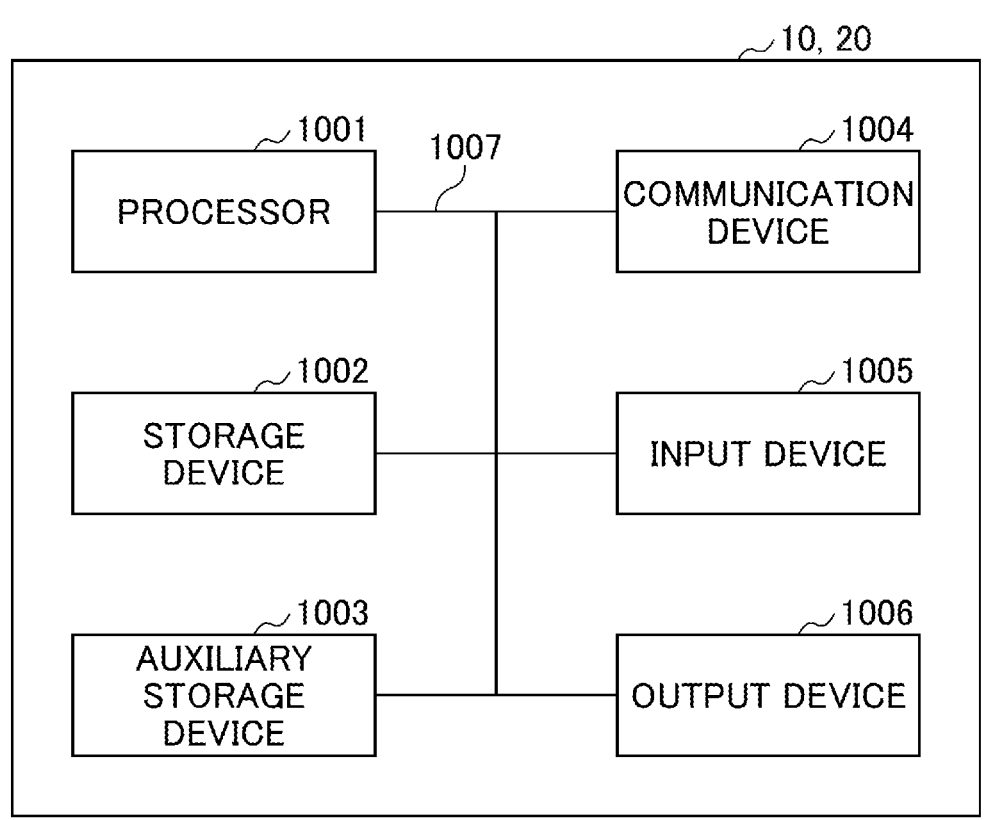
FIG. 15 illustrates an example of the hardware configuration of the base station 10 or the terminal 20 in the embodiment of the present invention.

FIG. 14 is a diagram illustrating an example of a functional configuration of the terminal 20. As illustrated in FIG. 14, the terminal 20 includes a transmitting unit 210, a receiving unit 220, a configuring unit 230, and a control unit 240. The functional configuration illustrated in FIG. 14 is only an example. As long as the operations according to the embodiment of the present invention can be executed, the functional division and the name of the functional unit may be any functional division and name. The transmitting unit 210 and the receiving unit 220 may be referred to as a communication unit.

The transmitting unit 210 creates transmission signals from the transmission data and wirelessly transmits the transmission signals. The receiving unit 220 wirelessly receives various kinds of signals and acquires signals of a higher layer from the received signals of the physical layer. Further, the transmitting unit 210 transmits HARQ-ACK, and the receiving unit 220 receives configuration information, etc., described in the embodiments.

The configuring unit 230 stores various kinds of configuration information received from the base station 10 or the terminal 20, by the receiving unit 220, in a storage device, and reads these pieces of information from the storage device as necessary. Further, the configuring unit 230 also stores pre-configured configuration information. The control unit 240 performs control, etc., of the entire terminal 20, including control relating to signal transmission and reception and control relating to LBT. Note that a functional unit relating to signal transmission in the control unit 240, may be included in the transmitting unit 210, and a functional unit relating to signal reception in the control unit 240, may be included in the receiving unit 220. Further, the transmitting unit 210 and the receiving unit 220 may be referred to as a transmitter and a receiver, respectively.

(Hardware Configuration)

The block diagrams (FIGS. 13 and 14) used for describing the embodiment described above are of blocks of functional units. These functional blocks (constituent units) are implemented by any combination of at least one of hardware and software. Methods for implementing each functional block are not particularly limited. That is, each functional block may be implemented by using one device in which elements are physically or logically combined, or two or more devices physically or logically separated may be directly or indirectly (for example, in a wired manner, a wireless manner) connected to each other, and each functional block may be implemented by these plural devices. The functional blocks may be implemented by combining software with the above one device or a plurality of devices.

The functions include determining, deciding, judging, calculating, computing, processing, deriving, investigating, searching, confirming, receiving, transmitting, outputting, accessing, resolving, selecting, adopting, establishing, comparing, assuming, expecting, considering, broadcasting, reporting, communicating, forwarding, configuring, reconfiguring, allocating, mapping, assigning, etc.; however, the functions are not limited as such. For example, a function block (constituent unit) that implements the transmission function is referred to as a transmitting unit or a transmitter. In any case, as described above, the implementation method is not particularly limited.

For example, the base station 10 and the terminal 20, etc., according to the embodiment of the present disclosure may function as a computer that performs processes of the radio communication method according to the present disclosure. FIG. is a diagram illustrating an example of a hardware configuration of the base station 10 and the terminal 20 according to the embodiment of the present disclosure. The base station 10 and the terminal 20 described above may be formed as a computer apparatus physically including a processor 1001, a storage device 1002, an auxiliary storage device 1003, a communication device 1004, an input device 1005, an output device 1006, a bus 1007, etc.

Note that in the following description, the term "device" can be read as a circuit, a device, or a unit. The hardware configuration of the base station 10 and the terminal 20 may be configured to include one or more devices illustrated in the figure, or may be configured to not include some of the devices.

The functions of the base station 10 and the terminal 20 are implemented by loading predetermined software (program) in hardware such as the processor 1001 and the storage device 1002, computing by the processor 1001, controlling communication by the communication device 1004, and controlling at least one of reading and writing of data in the storage device 1002 and the auxiliary storage device 1003.

The processor 1001 operates, for example, the operating system to control the entire computer. The processor 1001 may be formed of a central processing unit (CPU) including an interface with a peripheral device, a control device, an arithmetic device, and a register. For example, the above control unit 140 and the control unit 240, etc., may be implemented by the processor 1001.

Further, the processor 1001 loads a program (program code), a software module, or data, etc., from at least one of the auxiliary storage device 1003 and the communication device 1004, into the storage device 1002, and executes various processes according to the program, the software module, or the data. As the program, a program for causing a computer to execute at least part of the operations described in the above embodiment is used. For example, the control unit 140 of the base station 10 illustrated in FIG. 13 may be implemented by a control program stored in the storage device 1002 and operating on the processor 1001. Further, the control unit 240 of the terminal 20 illustrated in FIG. 14 may be implemented by a control program stored in the storage device 1002 and operating on the processor 1001. Although it has been described that the above-described various processes are executed by one processor 1001, the processes may be executed simultaneously or sequentially by two or more processors 1001. The processor 1001 may be implemented with one or more chips. Note that the program may be transmitted from the network via an electric communication line.

The storage device 1002 is a computer-readable recording medium and may be formed of at least one of a ROM (Read Only Memory), an EPROM (Erasable Programmable ROM), an EEPROM (Electrically Erasable Programmable ROM), and a RAM (Random Access Memory). The storage device 1002 may be referred to as a register, a cache, and a main memory, etc. The storage device 1002 can store executable programs (program codes), software modules, etc., for implementing the communication method according to the embodiment of the present disclosure.

The auxiliary storage device 1003 is a computer-readable recording medium, and may be formed of, for example, at least one of an optical disk such as a CD-ROM (Compact Disc ROM), a hard disk drive, a flexible disk, a magneto-optical disk (for example, a compact disk, a digital versatile disk, and a Blu-ray (registered trademark) disk), a smart card, a flash memory (for example, a card, a stick, and a key drive), a floppy (registered trademark) disk, and a magnetic strip, etc. The above-described storage medium may be, for example, a database including at least one of the storage device 1002 and the auxiliary storage device 1003, a server, or another appropriate medium.

The communication device 1004 is hardware (transmission/reception device) for performing communication between computers via at least one of a wired network and a wireless network, and is also referred to as a network device, a network controller, a network card, and a communication module, etc., for example. The communication device 1004 may be configured by including a high-frequency switch, a duplexer, a filter, a frequency synthesizer, etc., in order to implement at least one of frequency division duplex (FDD) and time division duplex (TDD). For example, a transmission/reception antenna, an amplifier unit, a transmission/reception unit, and a transmission line interface, etc., may be implemented by the communication device 1004. In the transmission/reception unit, the transmission unit and the reception unit may be physically or logically separated from each other.

The input device 1005 is an input device (for example, a keyboard, a mouse, a microphone, a switch, a button, and a sensor, etc.) that accepts input from the outside. The output device 1006 is an output device (for example, a display, a speaker, and an LED lamp, etc.) that performs output to the outside. Note that the input device 1005 and the output device 1006 may be integrated (for example, a touch panel).

Further, the respective devices such as the processor 1001 and the storage device 1002 are connected by a bus 1007 for communicating information. The bus 1007 may be formed of a single bus or may be formed by using different buses between the devices.

Further, the base station 10 and the terminal 20 may include hardware such as a microprocessor, a digital signal processor (DSP), an application specific integrated circuit (ASIC), a programmable logic device (PLD), and a field programmable gate array (FPGA), and a part of or all of the functional blocks may be implemented by the hardware. For example, the processor 1001 may be implemented by using at least one of these hardware elements.

Summary of Embodiments

As described above, according to the embodiment of the present invention, a communication apparatus is provided, including a receiving unit that receives a signal requesting a CSI (Channel State Information) report and a CSI reference signal from another communication apparatus at a resource selected autonomously by the other communication apparatus, a control unit that performs measurement by using the CSI reference signal, and a transmitting unit that transmits a CSI report based on the result of the measurement to the other communication apparatus.

The above configuration makes it possible to clarify operations relating to CSI measurement and reporting in a system in which the base station or the terminal 20 autonomously selects resources for DL, UL, or SL transmission. That is, in a wireless communication system that autonomously determines the resources to be used, the channel state is measured and the measurement result is reported so that the transmission quality can be improved.

If the receiving unit fails to receive data transmitted from the other communication apparatus a certain number of times or for a certain time, the transmitting unit may transmit the CSI report to the other communication apparatus. With this configuration, in a system in which the base station 10 or the terminal 20 autonomously selects resources for DL, UL, or SL transmission, the operation relating to CSI measurement and reporting can be clarified.

The transmitting unit may autonomously determine the resources used for transmitting the CSI report. With this configuration, in a system in which the base station 10 or the terminal 20 autonomously selects the resources for DL, UL, or SL transmission, operations relating to CSI measurement and reporting can be clarified.

The transmitting unit may transmit the CSI report by a certain time point after the receiving unit receives a signal requesting the CSI report. With this configuration, in a system in which the base station 10 or the terminal 20 autonomously selects a resource for DL, UL, or SL transmission, operations relating to CSI measurement and reporting can be clarified.

The control unit may autonomously determine the CSI reference signal to be used for measurement. With this configuration, in a system in which the base station 10 or the terminal 20 autonomously selects resources for DL, UL, or SL transmission, operations relating to CSI measurement and reporting can be clarified.

Further, according to an embodiment of the present invention, a communication method is provided, in which a communication apparatus performs a receiving procedure in which a signal requesting a CSI (Channel State Information) report and a CSI reference signal are received from another communication apparatus at a resource selected autonomously by the other communication apparatus, a control procedure in which measurement using the CSI reference signal is performed, and a transmission procedure in which a CSI report based on the result of the measurement is transmitted to the other communication apparatus.

With the above configuration, in a system in which the base station 10 or the terminal 20 autonomously selects resources for DL, UL, or SL transmission, the operation relating to CSI measurement and reporting can be clarified. That is, in a wireless communication system that autonomously determines the resources to be used, channel state is measured and the measurement result is reported so that the transmission quality can be improved.

Supplement of Embodiment

The embodiment of the present invention is described above; however the disclosed invention is not limited to the embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. The order of the processes in each of the processing procedures described in the embodiment may be re-arranged, provided that they do not contradict. For the convenience of description, the base station 10 and the terminal 20 are described by using the functional block diagrams; however, such devices may be implemented in hardware, software, or combinations thereof. The software to be executed by the processor included in the base station 10 in accordance with the embodiment of the present invention and the software to be executed by the processor included in the terminal 20 in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

Indication of information is not limited to the aspect or embodiment described in this disclosure and may be predetermined by using any other method. For example, the notification of information may be predetermined physical layer signaling (for example, Downlink Control Information (DCI), uplink control information (UCI)), higher layer signaling (for example, radio resource control (RRC) signaling, medium access control (MAC) signaling, broadcast information (master information block (MIB), system information block (SIB))), other signals, or a combination thereof. Further, the RRC signaling may be referred to as an "RRC message" and may be, for example, an RRC connection setup message, an RRC connection reconfiguration message, etc.

Each aspect and embodiment described in this disclosure is applicable to at least one of LTE, LTE-A, SUPER 3G, IMT-Advanced, 4G (4th generation mobile communication system), 5G (5th generation mobile communication system), NR (new Radio), future radio access (FRA), NR (New Radio), W-CDMA (registered trademark), GSM (registered trademark), CDMA2000, ultra-mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), and systems using any other appropriate systems and next generation systems expanded on the basis of the systems. Further, each aspect and embodiment described in this disclosure may be applied to a combination of a plurality of systems (for example, a combination of at least one of LTE and LTE-A, and 5G, etc.)

The processing procedures, the sequences, the flowcharts, etc., of the respective aspects/embodiments described in this specification may be reversed in order unless there is a contradiction. For example, the method described in this disclosure presents elements of various steps in an exemplary order and is not limited to a presented specific order.

In the present specification, a specific action that is supposed to be performed by the base station 10 may be performed by an upper node in some cases. In the network configured with one or a plurality of network nodes including the base station 10, various actions performed for communication with the terminal 20 can be obviously performed by at least one of the base station 10 and any network node (for example, an MME or an S-GW, etc., is considered, but it is not limited thereto) other than the base station 10. The example in which the number of network nodes excluding the base station 10 is one has been described above, but the other network nodes may be a combination of a plurality of other network nodes (for example, an MME and an S-GW).

Information or signals, etc., described in the present disclosure can be output from the higher layer (or the lower layer) to the lower layer (or the higher layer). Information, etc., may be input/output via a plurality of network nodes.

Input and output information, etc., may be stored in a specific place (for example, a memory) or may be managed by using a management table. Input and output information, etc., may be overwritten, updated, or additionally written. Output information, etc., may be deleted. Input information, etc., may be transmitted to another device.

The determination according to the present disclosure may be performed in accordance with a value (0 or 1) indicated by one bit, may be performed in accordance with a Boolean value (true or false), or may be performed by a comparison of numerical values (for example, a comparison with a value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, etc., regardless of whether software is called software, firmware, middleware, a microcode, a hardware description language, or any other name.

Further, software, commands, information, etc., may be transmitted and received via a transmission medium. For example, when software is transmitted from a web site, a server, or any other remote source using at least one of a wired technology (a coaxial cable, a fiber optic cable, a twisted pair, or a digital subscriber line (DSL), etc.) and a wireless technology (infrared rays or a microwave, etc.), at least one of the wired technology and the wireless technology is included in a definition of a transmission medium.

Information, signals, etc., described in the present disclosure may be indicated using any one of a variety of different techniques. For example, data, instructions, commands, information, signals, bits, symbols, chips, etc., which are mentioned throughout the above description may be indicated by voltages, currents, electromagnetic waves, magnetic particles, optical fields or photons, or an arbitrary combination thereof.

The terms described in this disclosure and terms necessary for understanding this specification may be replaced with terms having the same or similar meanings. For example, at least one of a channel and a symbol may be a signal (signaling). Further, a signal may be a message. Further, a component carrier (CC) may be referred to as a "carrier frequency", a "cell", or a "frequency carrier", etc.

The terms "system" and "network" used in the present disclosure are used interchangeably.

Further, information, parameters, etc., described in the present disclosure may be indicated by using absolute values, may be indicated by using relative values from predetermined values, or may be indicated by using corresponding other information. For example, radio resources may be those indicated by an index.

The names used for the above-described parameters are not limited in any respect. Further, mathematical formulas, etc., using the parameters may be different from those explicitly disclosed in the present disclosure. Since various channels (for example, the PUCCH, the PDCCH, etc.) and information elements, etc., can be identified by suitable names, the various names allocated to the various channels and the information elements are not limited in any respect.

In the present disclosure, the terms "base station", "radio base station", "base station", "fixed station", "Node B", "eNodeB (eNB)", "gNodeB (gNB)", "access point", "transmission point", "reception point", "transmission/reception point", "cell", "sector", "sector group", "carrier", "component carrier" can be used interchangeably.

The base station is also referred to as a macro cell, a small cell, a Femto cell, a pico cell, etc. The base station can accommodate one or more (for example, three) cells. When the base station accommodates a plurality of cells, the entire coverage area of the base station can be divided into a plurality of smaller areas, and each smaller area can provide communication service through a base station subsystem (for example, a small indoor base station remote radio head (RRH)). The term "cell" or "sector" refers to part or all of the coverage area of at least one of the base station and the base station subsystem that performs communication service in the coverage.

In the present disclosure, terms such as "MS: Mobile Station", "user terminal", "UE: User Equipment", and "terminal", etc., can be used interchangeably.

The mobile station UE is also referred to as a subscriber station, a mobile unit, a subscriber unit, a wireless unit, a remote unit, a mobile device, a wireless device, a radio communication apparatus, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission device, a reception device, a communication apparatus, etc. Note that at least one of the base station and the mobile station may be a device mounted on a mobile body, the mobile body itself, etc. The mobile body may be a vehicle (for example, a car, an airplane, etc.), a mobile body that moves unmanned (for example, a drone, an automatically driven vehicle, etc.), or a robot (manned type or unmanned type). Note that at least one of the base station and the mobile station also includes a device which does not necessarily move during the communication operation. For example, at least one of the base station and the mobile station may be an IoT (Internet of Things) device such as a sensor.

Further, the base station in the present disclosure may be read as a user terminal. For example, the communication between the base station and the user terminal is replaced with communication (for example, may be referred to as D2D (Device-to-Device), V2X (Vehicle-to-Everything)) between a plurality of terminals 20, and each aspect/embodiment of the present disclosure may be applied to the configuration after replacement. In this case, the terminal 20 may have the functions of the base station 10 described above. Further, terms such as "uplink" and "downlink" may also be read as terms corresponding to inter-terminal communication (for example, "side"). For example, uplink channels, downlink channels, etc., may be read as side channels.

Similarly, the user terminal in the present disclosure may be read as a base station. In this case, the base station may include the functions of the above-described user terminal.

In some cases, the terms "determining" and "deciding" used in the disclosure include various operations. The terms "determining" and "deciding" can include, for example, "determination" and "decision" for judging, calculating, computing, processing, deriving, investigating, looking-up, or search inquiry (for example, looking-up in a table, a database, or other data structures), and ascertaining operations. Further, the terms "determining" and "judging" can include "determination" and "decision" for receiving (for example, information reception), transmitting (for example, information transmission), input, output, and accessing (for example, accessing data in a memory) operations. The terms "determining" and "judging" can include "determination" and "decision" for resolving, selecting, choosing, establishing, and comparing operations. That is, the terms "determining" and "judging" can include "determination" and "decision" for any operation. Further, "determining (deciding)" may be read as "assuming", "expecting", and "considering".

The terms "connected" and "coupled" or all of the modifications of the terms mean all of direct and indirect connections or couplings between two or more elements and can include a case in which one or more intermediate elements are present between two "connected" or "coupled" elements. The coupling or connection between elements may be physical coupling or connection, logical coupling or connection, or a combination thereof. For example, "connect" may be read as "access". In the disclosure, it can be considered that two elements are "connected" or "coupled" to each other by using one or more electric wires, at least one of a cable and a printed electrical connection and by using electromagnetic energy with a wavelength in a radio frequency domain, a microwave domain, and an optical (both visible and invisible) domain as some non-restrictive and noncomprehensive examples.

The reference signal can be abbreviated to RS and may be called a pilot signal according to the standard to be applied.

In the present disclosure, the term "on the basis of" used in the specification does not mean "on the basis of only" unless otherwise stated. In other words, the term "on the basis of" means both "on the basis of only" and "on the basis of at least".

In the present disclosure, any reference to elements with the names "first" and "second" used in the specification does not generally limit the number of elements or the order of the elements. These names can be used as a convenient method for distinguishing two or more elements in the disclosure. Therefore, a reference to the first and second elements does not mean that only two elements can be used or that the first element needs to precede the second element in some form.

The term "means" in the structure of each of the above-mentioned devices may be substituted with, for example, a "unit", a "circuit", or a "device".

In the present disclosure, when "include", "including", and modifications thereof are used, these terms are intended to be inclusive, similarly to the term "comprising". Further, the term "or" used in the present disclosure does not mean exclusive OR.

The radio frame may be formed of one or more frames in the time domain. In the time domain, each of the one or more frames may be referred to as a subframe. The subframe may further include one or more slots in the time domain. The subframe may be a fixed time length (for example, 1 ms) independent of the numerology.

The numerology may be a communication parameter applied to at least one of transmission and reception of a certain signal or channel. The numerology may indicate at least one of, for example, a subcarrier spacing (SCS), a bandwidth, a symbol length, a cyclic prefix length, a transmission time interval (TTI), a number of symbols per TTI, a radio frame configuration, a particular filtering process performed in the frequency domain by the transceiver, a specific windowing process performed in the time domain by the transceiver, etc.

A slot may be formed of one or more symbols (OFDM (Orthogonal Frequency Division Multiplexing) symbol, SC-FDMA (Single Carrier Frequency Division Multiple Access) symbol, etc.) in the time domain. The slot may be a time unit based on the numerology.

A slot may include a plurality of minislots. Each minislot may be formed of one or more symbols in the time domain. Further, the minislot may be referred to as a subslot. A minislot may be formed of fewer symbols than a slot. The PDSCH (or PUSCH) transmitted in units of time greater than the minislots, may be referred to as PDSCH (or PUSCH) mapping type A. The PDSCH (or PUSCH) transmitted using minislots may be referred to as PDSCH (or PUSCH) mapping type B.

Radio frames, subframes, slots, minislots, and symbols all represent time units for transmitting signals. Radio frames, subframes, slots, minislots, and symbols may respectively be referred to by different names.

For example, one subframe may be referred to as a transmission time interval (TTI), or a plurality of consecutive subframes may be referred to as a TTI, or one slot or one minislot may be referred to as a TTI. That is, at least one of a subframe and TTI may be a subframe (1 ms) in existing LTE, a period shorter than 1 ms (for example, 1-13 symbols), or a period longer than 1 ms. Note that the unit representing TTI may be referred to as a slot, a minislot, etc., instead of a subframe.

Here, the TTI refers to the minimum time unit of scheduling in radio communication, for example. For example, in the LTE system, the base station performs scheduling for allocating radio resources (frequency bandwidth, transmission power, etc., that can be used in each terminal 20) in units of TTIs, to each terminal 20. Note that the definition of TTI is not limited as such.

The TTI may be a transmission time unit such as a channel coded data packet (transport block), a code block, a codeword, etc., or may be a processing unit such as scheduling, link adaptation, etc. Note that when a TTI is predetermined, a time interval (for example, the number of symbols) in which a transport block, a code block, a code word, etc., is actually mapped, may be shorter than the TTI.

Note that when one slot or one minislot is referred to as a TTI, one or more TTIs (i.e., one or more slots or one or more minislots) may be the minimum time unit of scheduling. Further, the number of slots (the number of minislots) constituting the minimum time unit of the scheduling, may be controlled.

A TTI having a time length of 1 ms may be referred to as a regular TTI (TTI in LTE Rel. 8-12), a normal TTI, a long TTI, a regular subframe, a normal subframe, a long subframe, a slot, etc. A TTI shorter than the regular TTI may be referred to as a reduced TTI, a short TTI, a partial or fractional TTI, a reduced subframe, a short subframe, a minislot, a subslot, a slot, etc.

Note that a long TTI (for example, a regular TTI, a subframe, etc.) may be read as a TTI having a time length exceeding 1 ms, and a short TTI (for example, a reduced TTI, etc.) may be read as a TTI having a TTI length that is less than the TTI length of the long TTI and greater than or equal to 1 ms.

The resource block (RB) is a resource allocation unit in the time domain and the frequency domain, and may include one or more consecutive subcarriers in the frequency domain. The number of subcarriers included in the RB may be the same irrespective of the numerology, for example, the number may be 12. The number of subcarriers included in the RB may be determined based on the numerology.

Further, the time domain of the RB may include one or more symbols, and may have a length of one slot, one minislot, one subframe, or one TTI. Each TTI, each subframe, etc., may be formed of one or more resource blocks.

Note that one or more RBs may be referred to as a physical resource block (PRB), a subcarrier group (SCG: Sub-Carrier Group), a resource element group (REG: Resource Element Group), a PRB pair, and an RB pair, etc.

Further, the resource block may be formed of one or more resource elements (RE). For example, the one RE may be a radio resource area of one subcarrier and one symbol.

A bandwidth part (BWP) (which may be referred to as partial bandwidth) may represent a subset of consecutive common resource blocks (RBs) for a certain numerology, in a certain carrier. Here, the common RB may be identified by the index of the RB based on the common reference point of the carrier. The PRB may be defined by a certain BWP and numbered in the BWP.

The BWP may include BWP for UL (UL BWP) and BWP for DL (DL BWP). For the terminal 20, one or more BWPs may be configured within one carrier.

At least one of the configured BWPs may be active, and the terminal 20 does not have to assume transmitting and receiving predetermined signals/channels outside of the active BWP. Note that a "cell", a "carrier", etc., in the present disclosure may be read as "BWP".

Structures such as the radio frames, subframes, slots, minislots, and symbols described above are merely illustrative. For example, configurations such as the number of subframes included in the radio frame, the number of slots per subframe or radio frame, the number of minislots included in the slot, the number of symbols and RBs included in the slot or minislot, the number of subcarriers included in the RB, the number of symbols in the TTI, the symbol length, the cyclic prefix (CP) length, etc., may be variously changed.

In the present disclosure, if an article is added by translation, such as a, an, the, etc., in English, the present disclosure may include a case where the noun following the article is plural.

In the present disclosure, the term "A and B are different" may mean "A and B are different from each other". Note that this term may mean "A and B are each different from C". Terms such as "separated", "coupled", etc., may also be interpreted in the same manner as "different".

Each aspect/embodiment described in the present disclosure may be used singly or in combination, or may be used by being switched in accordance with the execution. Further, reporting of predetermined information (for example, reporting "being X") is not limited to being reported explicitly; this may be done implicitly (for example, not reporting the predetermined information).

In the present disclosure, the base station 10 and the terminal 20, or a transmitting node and a receiving node are examples of communication apparatuses. CSI-RS is an example of a CSI reference signal.

Although the present disclosure has been described in detail above, it is clear to those skilled in the art that the present disclosure is not limited to the embodiment described in the present disclosure. The present disclosure may be implemented as modified and changed modes without departing from the purpose and scope of the present disclosure as determined by the description of the scope of the claims. Therefore, the descriptions in the present disclosure are for illustrative purposes only and do not have any limiting meaning to the present disclosure.

REFERENCE SIGNS LIST 10 base station
110 transmitting unit
120 receiving unit
130 configuring unit
140 control unit
20 terminal
210 transmitting unit
220 receiving unit
230 configuring unit
240 control unit
30 core network
1001 processor
1002 storage device
1003 auxiliary storage device
1004 communication device
1005 input device
1006 output device

The invention claimed is:

1. A communication apparatus comprising:

a receiver configured to receive, from another communication apparatus, a signal requesting a CSI (Channel State Information) report and a CSI reference signal, in a resource autonomously selected by the another communication apparatus;

a processor configured to perform measurement by using the CSI reference signal; and a transmitter configured to transmit, to the another communication apparatus, a CSI report based on a result of the measurement, wherein the processor is configured to autonomously determine a signal from among a data signal, a control signal, a reference signal, and a preamble signal received from the another communication apparatus after a predetermined timing from a timing at which the signal requesting the CSI report is received, as the CSI reference signal to be used for the measurement, and wherein the predetermined timing is specified by a control signal.

2. The communication apparatus according to claim 1, wherein the transmitter transmits the CSI report to the another communication apparatus, when the receiver fails to receive data transmitted from the another communication apparatus for a predetermined number of times or for a predetermined time.

3. The communication apparatus according to claim 1, wherein the transmitter autonomously determines the resource to be used for transmitting the CSI report.

4. The communication apparatus according to claim 3, wherein the transmitter transmits the CSI report by a predetermined time point after the receiver receives the signal requesting the CSI report.

5. A communication method executed by a communication apparatus, the communication method comprising:

receiving, from another communication apparatus, a signal requesting a CSI (Channel State Information) report, in a first resource autonomously selected by the another communication apparatus, and to receive a CSI reference signal, in a second resource autonomously selected by the another communication apparatus;

performing measurement by using the CSI reference signal; and transmitting, to the another communication apparatus, a CSI report based on a result of the measurement, wherein the communication apparatus autonomously determines a signal from among a data signal, a control signal, a reference signal, and a preamble signal received from the another communication apparatus after a predetermined timing from a timing at which the signal requesting the CSI report is received, as the CSI reference signal to be used for the measurement, and wherein the predetermined timing is specified by a control signal.

* * * * *